United States Patent
Yamashita

(10) Patent No.: US 11,927,243 B2
(45) Date of Patent: Mar. 12, 2024

(54) SHOCK ABSORBER

(71) Applicant: Hitachi Astemo, Ltd., Ibaraki (JP)

(72) Inventor: Mikio Yamashita, Zama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 482 days.

(21) Appl. No.: 17/270,462

(22) PCT Filed: Aug. 5, 2019

(86) PCT No.: PCT/JP2019/030692
§ 371 (c)(1),
(2) Date: Feb. 23, 2021

(87) PCT Pub. No.: WO2020/044973
PCT Pub. Date: Mar. 5, 2020

(65) Prior Publication Data
US 2021/0324935 A1    Oct. 21, 2021

(30) Foreign Application Priority Data

Aug. 29, 2018  (JP) ................. 2018-159983

(51) Int. Cl.
*F16F 9/36* (2006.01)
*F16F 9/18* (2006.01)
*F16F 9/32* (2006.01)
*F16F 9/516* (2006.01)
*B60G 17/06* (2006.01)

(52) U.S. Cl.
CPC ............ *F16F 9/516* (2013.01); *F16F 9/18* (2013.01); *F16F 9/32* (2013.01); *F16F 9/36* (2013.01);
(Continued)

(58) Field of Classification Search
CPC ........ F16F 9/18; F16F 9/32; F16F 9/36; F16F 9/364; F16F 9/516; F16F 222/04;
(Continued)

(56) References Cited

U.S. PATENT DOCUMENTS 5,664,651 A  *  9/1997  Miura .................. F16F 9/363
                                                         277/565
6,547,046 B2    4/2003  Yamaguchi et al.
(Continued)

FOREIGN PATENT DOCUMENTS

CN    103742651 A    4/2014
JP    2003130119 A  *  5/2003  ............... F16F 9/36
(Continued)

OTHER PUBLICATIONS

German Office Action received in corresponding German Application No. 11 2019 004 375.7 dated Jun. 27, 2022.
(Continued)

*Primary Examiner* — Christopher P Schwartz
(74) *Attorney, Agent, or Firm* — Mattingly & Malur, PC

(57) ABSTRACT

A shock absorber includes a seal member that is slidably in contact with a piston rod, a friction member that is formed of an annular elastic rubber section slidably in contact with the piston rod and an annular base section to which the elastic rubber section is fixed, and an communication path that reduces pressure difference between both sides of the friction member in axial direction. The elastic rubber section is provided with a minimum inner diameter section, a first enlarged diameter section, and a second enlarged diameter section. A force is applied to the piston rod by the friction member such that movement in an outward direction of the cylinder becomes difficult and movement in an inward direction of the cylinder becomes easy.

4 Claims, 11 Drawing Sheets

(52) U.S. Cl.
CPC .......... *B60G 17/06* (2013.01); *B60G 2202/23* (2013.01); *B60G 2202/24* (2013.01); *B60G 2206/41* (2013.01); *B60G 2500/10* (2013.01); *B60G 2600/21* (2013.01); *B60G 2800/162* (2013.01); *F16F 9/364* (2013.01); *F16F 2222/04* (2013.01); *F16F 2222/12* (2013.01); *F16F 2228/066* (2013.01); *F16F 2230/02* (2013.01); *F16F 2230/30* (2013.01); *F16F 2232/08* (2013.01); *F16F 2234/02* (2013.01)

(58) Field of Classification Search
CPC ............. F16F 222/12; F16F 2228/066; F16F 2230/02; F16F 2230/30; F16F 2232/08; F16F 2234/02; B60G 17/06; B60G 2202/23; B60G 2202/24; B60G 2206/41; B60G 2600/21; B60G 2800/162
USPC ........................................ 188/322.16–322.18
See application file for complete search history.

(56) References Cited

U.S. PATENT DOCUMENTS 9,360,078 B2 * 6/2016 Yamashita ................ F16F 9/18
2001/0023638 A1 9/2001 Yamaguchi et al.
2015/0204412 A1 7/2015 Yamashita et al.
2021/0348668 A1 * 11/2021 Nakagawa ................ F16F 9/19

FOREIGN PATENT DOCUMENTS

| JP | 2004-251415 A | 9/2004 |
|---|---|---|
| JP | 2007-92926 A | 4/2007 |
| JP | 4546860 B2 | 9/2010 |
| JP | 5810220 B2 | 11/2015 |
| KR | 10-1285827 B1 | 7/2013 |

OTHER PUBLICATIONS

Korean Office Action received in corresponding Korean Application No. 10-2020-7035039 dated Jun. 20, 2022.
Lang et al., "Elastomerdichtungen und deren anwendungsbezogene Auswahl", Prüfen Und Messen, Dec. 2008, pp. 660-664, KGK Rubberpoint.
International Search Report received in corresponding International Application No. PCT/JP2019/030692 dated Oct. 1, 2019.
Written Opinion received in corresponding International Application No. PCT/JP2019/030692 dated Oct. 1, 2019.
Chinese Office Action received in corresponding Chinese Application No. 201980054837.5 dated Oct. 17, 2022.

* cited by examiner

SHOCK ABSORBER

TECHNICAL FIELD

The present invention relates to a shock absorber.

The present application claims priority based on Japanese Patent Application No. 2018-159983 filed in Japan on Aug. 29, 2018, the contents of which are incorporated herein by reference.

BACKGROUND ART

There is a shock absorber which includes a friction member that generates frictional resistance with respect to a moving piston rod, in addition to a seal member that prevents leakage of a working liquid (for example, refer to Patent Documents 1 and 2).

CITATION LIST

Patent Literature

[Patent Literature 1]
Japanese Patent No. 4546860
[Patent Document 2]
Japanese Patent No. 5810220

SUMMARY OF INVENTION

Technical Problem

In a shock absorber, it is desired to obtain preferable damping force characteristics by using a friction member.

The present invention provides the shock absorber that is capable of obtaining the preferable damping force characteristics.

Solution to Problem

According to one aspect of the present invention, a shock absorber is configured to apply a force to a piston rod by a friction member such that movement of the piston rod in an outward direction of a cylinder becomes difficult and movement of the piston rod in an inward direction of the cylinder becomes easy.

Advantageous Effects of Invention

According to the above-described shock absorber, it is possible to obtain preferable damping force characteristics.

DESCRIPTION OF EMBODIMENTS

First Embodiment

A shock absorber according to a first embodiment of the present invention will be described below with reference to FIGS. 1 to 5.

Figure 1:
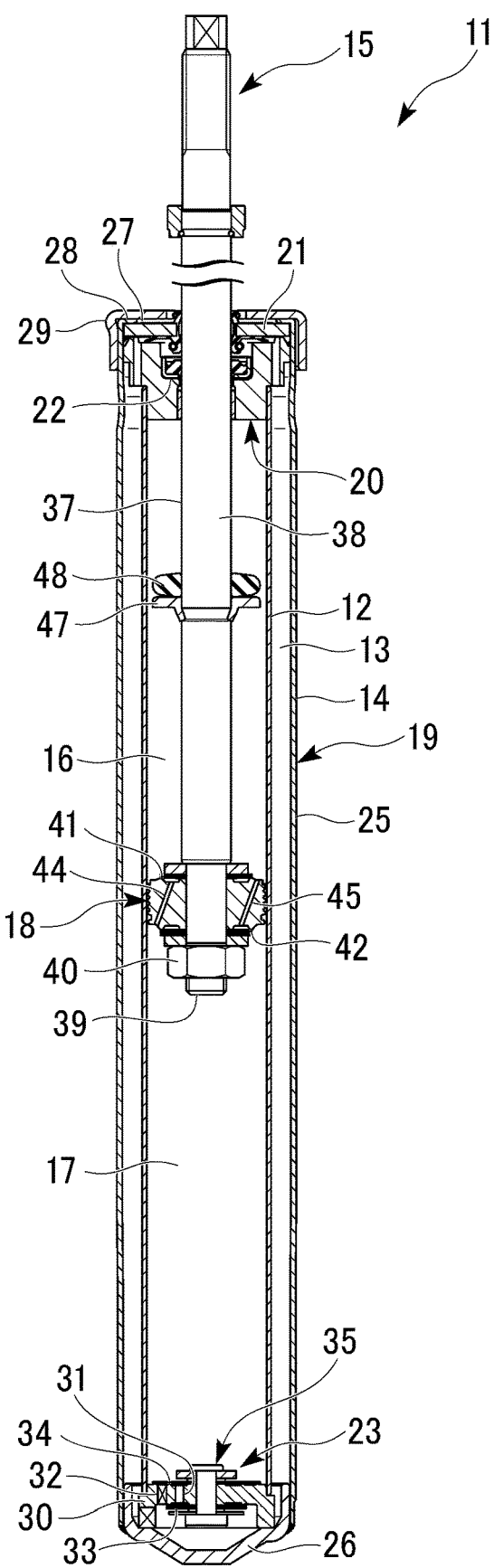
FIG. 1 is a cross-sectional view showing a shock absorber according to a first embodiment of the present invention.

A shock absorber 11 according to the first embodiment shown in FIG. 1 is a liquid-pressure shock absorber in which a working liquid is used as a working fluid. More specifically, the shock absorber 11 is an oil-pressure shock absorber in which an oil liquid is used as the working liquid. The shock absorber 11 is mainly used for a suspension device of a vehicle.

The shock absorber 11 includes an inner tube 12, an outer tube 14 that has a larger diameter larger than the inner tube 12 and is coaxially disposed so as to form a reservoir chamber 13 with the inner tube 12, a piston rod 15 that is disposed on a central axial line of the inner tube 12 and that has one axial side which is inserted into an inside of the inner tube 12 and the other axial side which extends to an outside from the inner tube 12 and the outer tube 14, and a piston 18 that is connected to one end section of the piston rod 15 to be slidably fitted to an inside of the inner tube 12 and that divides the inside of the inner tube 12 into two chambers 16 and 17 (cylinder inner chambers). That is, the shock absorber 11 is a double cylinder type in which a cylinder 19 includes the inner tube 12 and the outer tube 14. The piston 18 is slidably fitted to the inside of the inner tube 12 of the cylinder 19, and divides the inside of the inner tube 12 of the cylinder 19 into the two chambers 16 and 17. The piston rod 15 is connected to the piston 18 and extends to an outside of the cylinder 19.

Note that, the present invention is not limited to the double cylinder type and it is possible to be used in a single cylinder type liquid-pressure shock absorber. Furthermore, it is possible to use the present invention for a liquid-pressure shock absorber or the like using a damping force adjusting mechanism.

The piston rod 15 integrally moves with the piston 18 connected to one end section of the piston rod 15. The other end section of the piston rod 15 protrudes to the outside from the cylinder 19, that is, the inner tube 12 and the outer tube 14. The inner tube 12 of the cylinder 19 is filled with the oil liquid as the working liquid. The reservoir chamber 13 between the inner tube 12 and the outer tube 14 is filled with the oil liquid as the working liquid and a high pressure gas. Note that, the reservoir chamber 13 may be filled with atmospheric pressure air instead of the high pressure gas.

The shock absorber 11 includes a rod guide 20 that is disposed at an end section position of the cylinder 19 on a side where the piston rod 15 protrudes, a seal member 21 disposed on an outside (an upper side in a vertical direction of FIGS. 1 and 2) rather than the rod guide 20 in an inner and outer direction in the axial direction of the cylinder 19 (the vertical direction in FIGS. 1 and 2, hereinafter, referred to as a cylinder inner and outer direction) at an end section position of the cylinder 19 on a side where the piston rod 15 protrudes, a friction member 22 disposed between the seal member 21 and the rod guide 20 further inside (a lower side in the vertical direction of FIGS. 1 and 2) in the cylinder inner and outer direction than the seal member 21, and a base valve 23 disposed at an end section of the cylinder 19 in the axial direction on a side opposite to the rod guide 20, the seal member 21, and the friction member 22.

All of the rod guide 20, the seal member 21, and the friction member 22 have an annular shape, and the piston rod 15 is slidably inserted into each inside thereof. The rod guide 20 supports the piston rod 15 such that movement in the axial direction is possible while regulating movement in a radial direction to guide the movement of the piston rod 15. The seal member 21 slidably contacts with an outer peripheral section of the piston rod 15, which moves in the axial direction, in an inner peripheral section thereof, and prevents the oil liquid in the inner tube 12 and the high-pressure gas and the oil liquid in the reservoir chamber 13 in the outer tube 14 from leaking from the cylinder 19 to the outside. In other words, the seal member 21 prevents the oil liquid and the gas in the cylinder 19 from leaking from the shock absorber 11 to the outside. The friction member 22 slidably contacts with the outer peripheral section of the piston rod 15 in an inner peripheral section thereof, and generates frictional resistance with respect to the piston rod 15, thereby being not aimed at sealing.

The outer tube 14 of the cylinder 19 has a substantially bottomed cylindrical shape having a cylindrical barrel member 25 and a bottom member 26 that closes one end side of the barrel member 25, which is opposite to a protruding side of the piston rod 15. The barrel member 25 includes a locking section 28 that protrudes to the inside in the radial direction from a position of an opening section 27 on the protruding side of the piston rod 15. A cover 29 is attached to a side of the outer tube 14 closer to the opening section 27 so as to cover the locking section 28 and the seal member 21.

The inner tube 12 of the cylinder 19 has an annular tube shape. One axial end side of the inner tube 12 is supported in a state of being fitted by the base body 30 of the base valve 23 disposed inside the bottom member 26 of the outer tube 14, and the other axial end side is supported by the rod guide 20 in a state of being fitted to the rod guide 20, the rod guide 20 being fitted inside the opening section 27 of the outer tube 14.

The base body 30 of the base valve 23 is formed with oil paths 31 and 32 capable of communicating the reservoir chamber 13 between the inner tube 12 and the outer tube 14 with the chamber 17 in the inner tube 12. In the base body 30, a disc valve 33 as a contraction-side damping valve that is capable of opening and closing the inner oil path 31 is disposed on a side of the bottom member 26 in the axial direction, and a disc valve 34 as a check valve that is capable of opening and closing the outer oil path 32 is disposed on a side opposite to the bottom member 26 in the axial direction. The disc valves 33 and 34 are attached to the base body 30 by rivets 35 inserted into the base body 30.

The disc valve 33 allows flow of the oil liquid from the chamber 17 to the reservoir chamber 13 through a not-shown path hole of the disc valve 34 and the oil path 31 to generate the damping force, and regulate the flow of the oil liquid in an opposite direction. On the contrary, the disc valve 34 allows the flow of the oil liquid from the reservoir chamber 13 to the chamber 17 through the oil path 32 without resistance, and regulates the flow of the oil liquid in the opposite direction. That is, the disc valve 33 is the damping valve that opens the oil path 31 when the piston rod 15 moves to the contraction side, the piston 18 moves to the side of the chamber 17, and the pressure in the chamber 17 rises, to generate the damping force at that time. The disc valve 34 is a suction valve that opens the oil path 32 when the piston rod 15 moves to the extension side, the piston 18 moves to the side of the chamber 16, and the pressure in the chamber 17 drops, and, at that time, allows the oil liquid to flow from the reservoir chamber 13 to the chamber 17 without substantially generating the damping force.

Note that, the disc valve 34 as the check valve may positively generate the damping force on the extension side. In addition, the disc valves 33 and 34 may be omitted and an orifice may be used instead.

The piston rod 15 includes a main shaft section 38 having an outer peripheral surface 37 formed of an annular tube surface having a constant diameter, and an inner end shaft section 39 having a smaller diameter than that of the main shaft section 38 at an end section on a side to be inserted into the inner tube 12.

A nut 40 is screwed into the inner end shaft section 39. The piston 18 and the disc valves 41 and 42 on both sides of the piston 18 are attached to the inner end shaft section 39 by the nut 40.

The chamber 16 is formed between the piston 18 and the rod guide 20. The chamber 16 is a rod-side chamber through which the piston rod 15 penetrates inside thereof. The chamber 17 is formed between the piston 18 and the base valve 23. The chamber 17 is a bottom-side chamber on the side of the bottom member 26 of the cylinder 19.

The piston rod 15 does not penetrate the inside of the chamber 17.

The piston rod 15 is provided with a stopper member 47 and a shock absorbing body 48, which each has an annular shape, at a part of the main shaft section 38 between the piston 18 and the rod guide 20. The piston rod 15 is inserted into the stopper member 47 on the inner peripheral side, and the stopper member 47 is swaged and fixed to the main shaft section 38. The piston rod 15 is inserted into an inside of the shock absorbing body 48, and the shock absorbing body 48 is disposed between the stopper member 47 and the rod guide 20.

The piston 18 is formed with oil paths 44 and 45 that is capable of communicating the chamber 17 on the side of the bottom member 26 of the inner tube 12 with the chamber 16 on the side opposite to the bottom member 26. In addition, on the piston 18, the disc valve 41, which is the contraction-side damping valve that is capable of opening and closing the oil path 44, is disposed on the side opposite to the bottom member 26, and the disc valve 42 as an extension-side damping valve that is capable of opening and closing the oil path 45 is disposed on the side of the bottom member 26.

The disc valve 41 allows the flow of the oil liquid from the chamber 17 to the chamber 16 through the oil path 44, and regulates the flow of the oil liquid in the opposite direction. On the contrary, the disc valve 42 allows the flow of the oil liquid from the chamber 16 to the chamber 17 through the oil path 45, and regulates the flow of the oil liquid in the opposite direction. Note that, a not-shown fixed orifice is provided between the disc valve 41 and the piston 18 to cause the chamber 17 to communicate with the chamber 16 through the oil path 44 even when the disc valve 41 is closed. A not-shown fixed orifice is provided between the disc valve 42 and the piston 18 to cause the chamber 17 to communicate with the chamber 16 through the oil path 45 even when the disc valve 42 is closed.

When the piston rod 15 moves to the contraction side and the piston 18 moves to the side of the chamber 17 so that the pressure in the chamber 17 increases, a not-shown fixed orifice allows the oil liquid to flow from the chamber 17 to the chamber 16 in a fixed flow path area in a region where a moving speed of the piston 18 (hereinafter, referred to as a piston speed) is slow, thereby generating the damping force having orifice characteristics. In addition, in a region where the piston speed is high, the disc valve 41 separates from the piston 18 to open the oil path 44, and allows the oil liquid to flow from the chamber 17 to the chamber 16 in a flow path area according to the amount of separation from the piston 18, and thus the damping force of the valve characteristics is generated.

When the piston rod 15 moves to the extension side, the piston 18 moves to the chamber 16 side, and the pressure in the chamber 16 increases, a not-shown fixed orifice allows the oil liquid to flow from the chamber 16 to the chamber 17 in the fixed flow path area in a region where the piston speed is slow, thereby generating the damping force having orifice characteristics. In addition, in the region where the piston speed is high, the disc valve 42 separates from the piston 18 to open the oil path 45, and allows the oil liquid to flow from the chamber 16 to the chamber 17 in the flow path area according to the amount of separation from the piston 18, and thus the damping force having the valve characteristics is generated.

When the piston rod 15 moves to the extension side and the amount of protrusion from the cylinder 19 increases, the oil liquid corresponding to the amount of protrusion flows from the reservoir chamber 13 to the chamber 17 through the oil path 32 while opening the disc valve 34 of the base valve 23. On the contrary, when the piston rod 15 moves to the contraction side and the amount of insertion into the cylinder 19 increases, the oil liquid corresponding to the amount of insertion flows from the chamber 17 to the reservoir chamber 13 through the oil path 31 while opening the disc valve 33.

Figure 2:
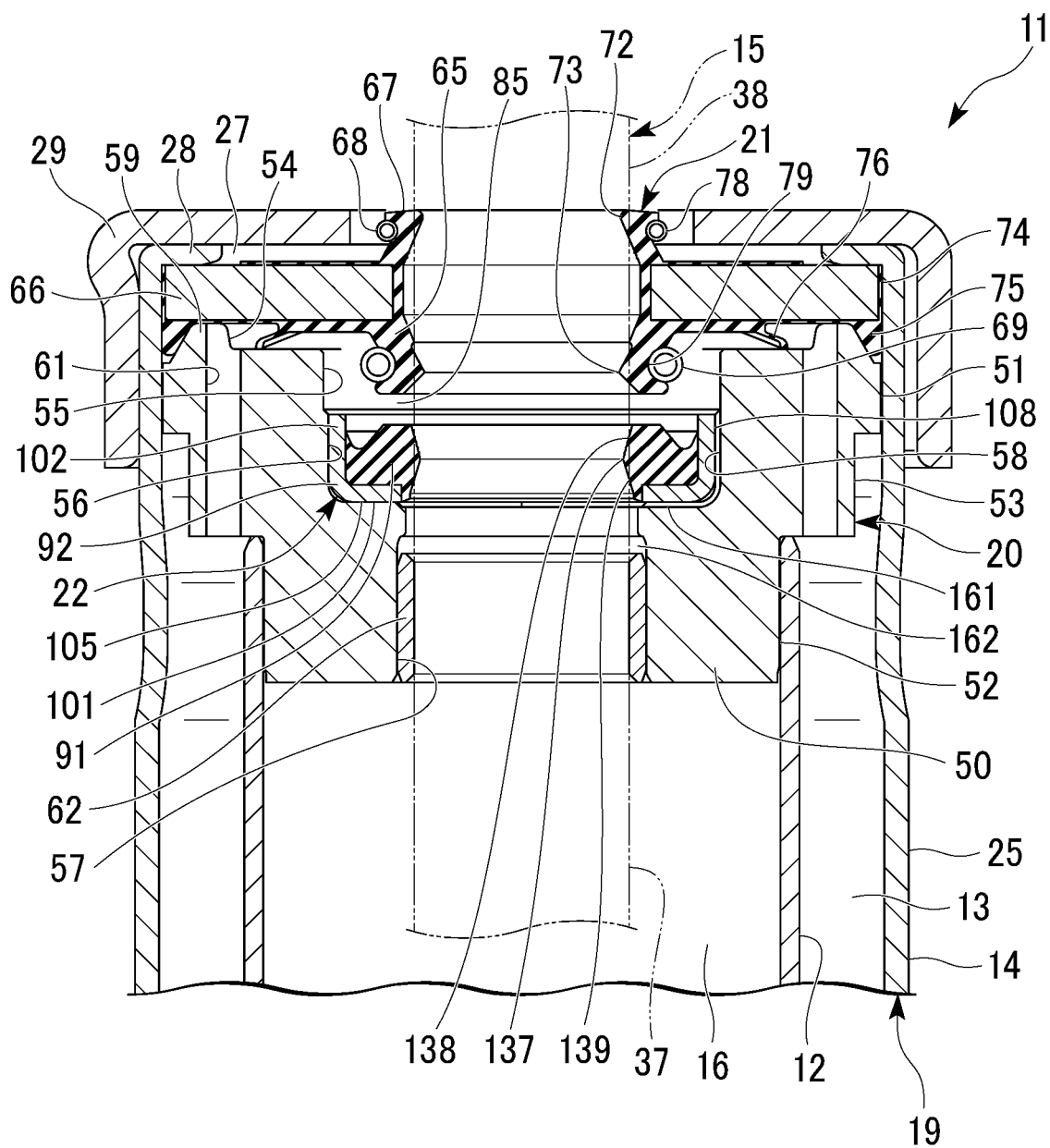
FIG. 2 is a cross-sectional view showing a main part of the shock absorber according to a first embodiment of the present invention.

As shown in FIG. 2, the rod guide 20 has a rod guide main body 50 made of metal having a substantially-stepped annular tube shape. The rod guide main body 50 has an external shape having a large diameter outer diameter section 51 on one axial side, a small diameter outer diameter section 52 having a smaller diameter than that of the large diameter outer diameter section 51 on the other axial side, and a medium diameter outer diameter section 53 having an intermediate outer diameter therebetween. The large diameter outer diameter section 51 of the rod guide main body 50 fits to an inner peripheral section of the barrel member 25 of the outer tube 14, and the small diameter outer diameter section 52 of the rod guide 20 fits to an inner peripheral section of the inner tube 12.

At a center of the rod guide main body 50 in the radial direction, a maximum diameter hole section 54 is formed at an end section on a side closer to the large diameter outer diameter section 51 in the axial direction. A large diameter hole section 55 having a smaller diameter than that of the maximum diameter hole section 54 is formed on a side closer to the small diameter outer diameter section 52 in the axial direction rather than the maximum diameter hole section 54. A medium diameter hole section 56 having a slightly smaller diameter than that of the large diameter hole section 55 is formed on a side opposite to the maximum diameter hole section 54 of the large diameter hole section 55 in the axial direction. A small diameter hole section 57 having a smaller diameter than that of the medium diameter hole section 56 is formed on a side opposite to the large diameter hole section 55 of the medium diameter hole section 56 in the axial direction.

A communication groove 58 is continuously formed on an inner peripheral surface and a bottom surface of the medium diameter hole section 56. The communication groove 58 is formed on an inner peripheral surface of the medium diameter hole section 56 over a whole length in the axial direction, and is formed on a bottom surface of the medium diameter hole section 56 over a whole length in the radial direction. That is, the communication groove 58 is formed to connect an inner peripheral surface of the large diameter hole section 55 and an inner peripheral surface of the small diameter hole section 57.

An annular protruding section 59 is formed to protrude outward in the axial direction at an end section on the side of the large diameter outer diameter section 51 of the rod guide main body 50 in the axial direction. The maximum diameter hole section 54 is formed inside the annular protruding section 59. The rod guide main body 50 is formed with a communication hole 61 penetrating along the axial direction on an inner diameter side of the annular protruding section 59. One end side of the communication hole 61 is opened in the maximum diameter hole section 54, and the other end side is opened in an end surface of the medium diameter outer diameter section 53 on the side closer to the small diameter outer diameter section 52. The communication hole 61 communicates with the reservoir chamber 13 between the outer tube 14 and the inner tube 12.

The rod guide 20 is formed of the rod guide main body 50 and an annular tube-shaped collar 62 that is fitted and fixed to an inner peripheral section of the rod guide main body 50. The collar 62 is formed by coating an inner periphery of an annular tube body formed of metal, such as an SPCC material or an SPCE material, with fluororesin-impregnated bronze. The collar 62 is fitted in the small diameter hole section 57 of the rod guide main body 50. The piston rod 15 is inserted into the collar 62 of the rod guide 20 so that the outer peripheral surface 37 of the main shaft section 38 is slidably in contact with the collar 62. The collar 62 is fitted and fixed to an end section of the small diameter hole section 57 on a side opposite to the medium diameter hole section 56. In other words, the small diameter hole section 57 has a part where the collar 62 does not exist on a side closer to the medium diameter hole section 56.

The seal member 21 is disposed at one axial end section of the cylinder 19, and is in pressure contact with the outer peripheral surface 37 of the main shaft section 38 of the piston rod 15 in the inner peripheral section thereof, thereby regulating outer leakage of the oil liquid or the like which leaks from a gap between the rod guide 20 and the main shaft section 38 of the piston rod 15. Note that, FIG. 2 shows a side of the rod guide 20 of the shock absorber 11 in a state where the piston rod 15 is removed, and, therefore, the seal member 21 is in a natural state before the piston rod 15 is inserted. Further, the outer peripheral surface 37 of the main shaft section 38 of the piston rod 15 in a case of being inserted is represented by a virtual line (dashed line).

The seal member 21 is formed of an oil seal body 67 that is an integrally molded product formed of a seal section 65, which is formed of an elastic rubber material, such as nitrile rubber or fluororubber, having preferable slidability, and a metal annular-shaped annular member 66 which is embedded in the seal section 65 to maintain a shape of the seal member 21 and obtains strength for fixing, an annular spring 68 which is fitted in the outer peripheral section of the seal section 65 of the oil seal body 67 on an outside in the cylinder inner and outer direction, and an annular spring 69 which is fitted in the outer peripheral section of the seal section 65 on an inside in the cylinder inner and outer direction.

A part of the seal section 65 on an inside in the radial direction includes an annular tubular-shaped dust lip 72 which extends in a direction apart from the annular member 66 along the axial direction from the outside in the cylinder inner and outer direction on the inner peripheral side of the annular member 66, and an annular tubular oil lip 73 which extends in the direction apart from the annular member 66 along the axial direction from the inside in the cylinder inner and outer direction on the inner peripheral side of the annular member 66. In addition, a part of the seal section 65 on an outside in the radial direction includes an outer peripheral seal 74 that covers an outer peripheral surface of the annular member 66 at an outer end section position of the seal section 65, and an annular seal lip 75 that extends to the inside in the cylinder inner and outer direction from the outer peripheral seal 74. Further, the seal section 65 includes a tapered check lip 76 that protrudes toward the inside in the cylinder inner and outer direction in a middle part in the radial direction, and extends such that a diameter is enlarged as being a protruding tip side.

The dust lip 72 has a tapered tube shape whose inner diameter becomes smaller as being apart from the annular member 66 to the outside in the cylinder inner and outer direction as a whole. An outer peripheral section thereof is formed with an annular groove 78, to which the spring 68 is fitted, to be recessed inward in the radial direction.

The oil lip 73 has a tapered tube shape whose diameter becomes smaller as being apart from the annular member 66 to the inside in the cylinder inner and outer direction as a whole. An outer peripheral section thereof is formed with an annular groove 79, to which the spring 69 is fitted, to be recessed inward in the radial direction.

The seal member 21 is in sealed contact with the inner peripheral section of the barrel member 25 of the outer tube 14 in the outer peripheral seal 74 in a state in which the dust lip 72 is disposed on an atmospheric side, that is, on the outside in the cylinder inner and outer direction and the oil lip 73 is disposed on the inside in the cylinder inner and outer direction inside. In this state, the annular member 66 is interposed and locked between the annular protruding section 59 of the rod guide 20 and the swaged locking section 28 of the outer tube 14. At this time, in the seal member 21, the seal lip 75 is disposed between the annular protruding section 59 of the rod guide 20 and the outer tube 14, and is in sealed contact with them. In addition, the oil lip 73 is disposed in the large diameter hole section 55 of the rod guide 20 with a gap in the radial direction.

The main shaft section 38 of the piston rod 15 is inserted into the inside of the dust lip 72 and the oil lip 73 in the seal member 21 in a state of being attached to the cylinder 19. In this state, one end of the piston rod 15 protrudes from one end of the cylinder 19. The dust lip 72 is provided on one end side, from which the piston rod 15 protrudes, of the cylinder 19. The oil lip 73 is provided on the inside of the dust lip 72 in the cylinder inner and outer direction.

The spring 68 fitted to the annular groove 78 of the dust lip 72 is for maintaining a tightening force of the dust lip 72 in an adhesion direction to the piston rod 15 in a constant state. The spring 68 is also used to adjust the tightening force to fulfill design specifications. The spring 69 fitted in the annular groove 79 of the oil lip 73 adjusts the tightening force of the oil lip 73 in the adhesion direction to the piston rod 15.

The check lip 76 of the seal section 65 is capable of being sealed contact over a whole periphery with a predetermined tightening allowance on a flat bottom surface along a direction orthogonal to an axis of the maximum diameter hole section 54 of the rod guide 20. The oil liquid leaking from the chamber 16 through a gap between the rod guide 20 and the piston rod 15 are collected in a chamber 85 formed mainly by the large diameter hole section 55 on a side of the gap rather than the check lip 76 of the seal member 21. The check lip 76 is provided between the chamber 85 and the communication hole 61 of the rod guide 20. The check lip 76 opens when a pressure in the chamber 85 becomes higher than a pressure in the reservoir chamber 13 by a predetermined amount, and causes the oil liquid collected in the chamber 85 to flow into the reservoir chamber 13 through the communication hole 61. That is, the check lip 76 functions as a check valve that allows the flow of the oil liquid only in a direction from the chamber 85 to the reservoir chamber 13, and regulates flow of the oil liquid and the gas in a reverse direction.

In the seal member 21, the dust lip 72 adheres to the piston rod 15 by the tightening allowance and a tension force of the spring 68, and maintains airtightness. The dust lip 72 mainly regulates entry of a foreign matter attached to the piston rod 15 when the piston rod 15 is exposed to the outside. In addition, the oil lip 73 also adheres to the piston rod 15 by the tightening allowance and a tension force of the spring 69, and maintains the airtightness. The oil lip 73 scrapes off the oil liquid attached to the piston rod 15 when the piston rod 15 advances to the outside, regulates leakage to the outside, and keeps the oil liquid in the chamber 85.

Figure 3:
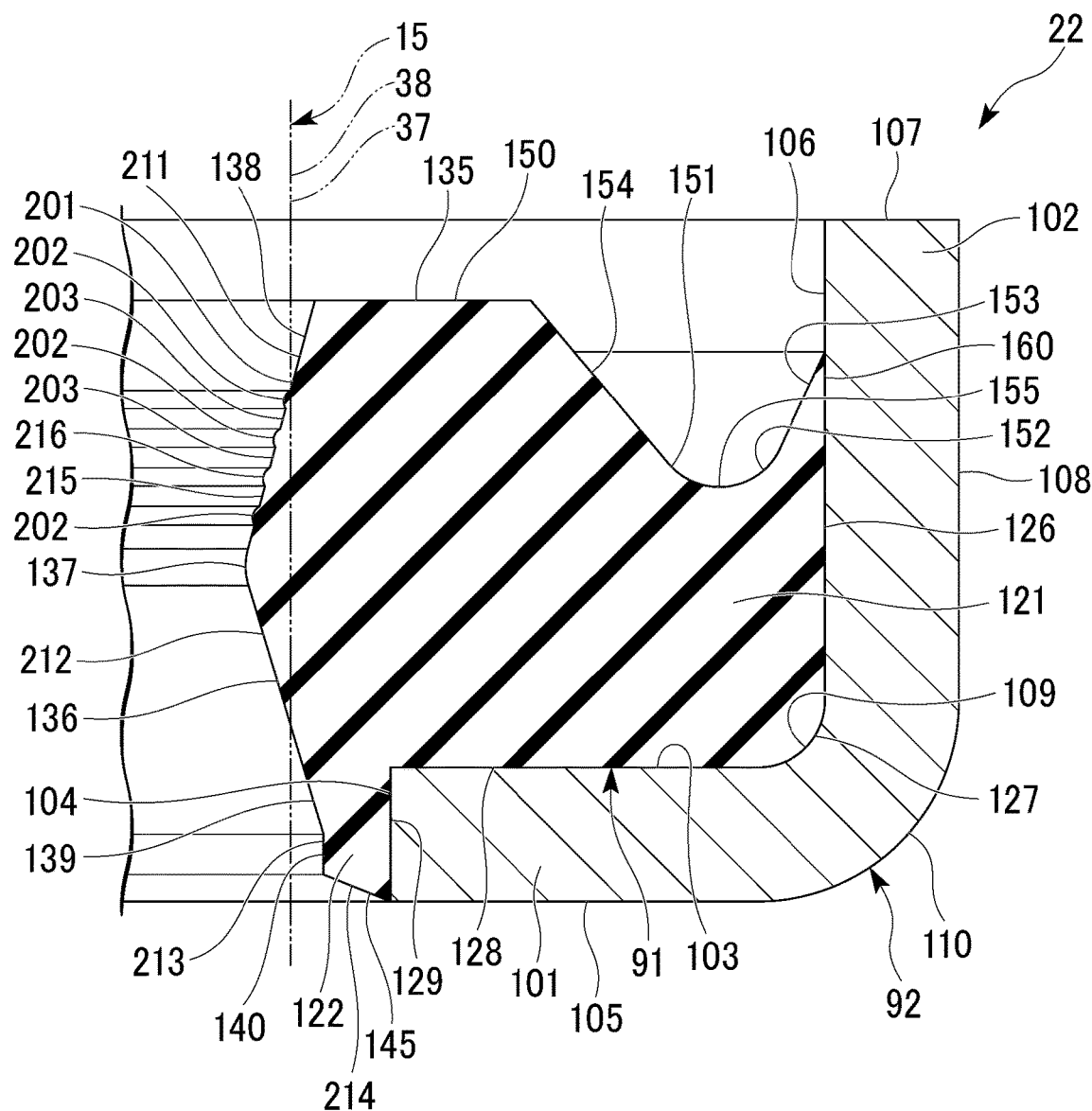
FIG. 3 is a half cross-sectional view showing a friction member of the shock absorber according to the first embodiment of the present invention.

The friction member 22 is fitted in the medium diameter hole section 56 of the rod guide 20. Therefore, the friction member 22 is disposed further inside of the cylinder 19 than the seal member 21. The friction member 22 is in pressure contact with the outer peripheral surface 37 of the main shaft section 38 of the piston rod 15 in the inner peripheral section thereof. The friction member 22 generates the frictional resistance with respect to the piston rod 15. Note that, FIGS. 2 and 3 show a state in which the piston rod 15 is removed, and the friction member 22 is in a natural state before the piston rod 15 is inserted. Further, the outer peripheral surface 37 of the main shaft section 38 of the piston rod 15 in a case of being inserted is represented by a virtual line (dashed line). That is, in FIGS. 2 and 3, the friction member 22 does not bite into the piston rod 15.

As shown in FIG. 2, the friction member 22 is an integrally molded product formed of an annular elastic rubber section 91 formed of an elastic rubber material such as nitrile rubber or fluororubber, and a metal annular base section 92 to which the elastic rubber section 91 is fixed. The friction member 22 is fitted in the medium diameter hole section 56 of the rod guide 20 at the base section 92, and the elastic rubber section 91 slidably contacts with the outer peripheral surface 37 of the main shaft section 38 of the piston rod 15. The base section 92 maintains the shape of the elastic rubber section 91 and is used to obtain strength for fixing. Note that, the friction member 22 may be configured only by the elastic rubber section 91. That is, the friction member 22 may not be integrally formed with the base section 92. In that case, an attachment method is not limited to fixing to the base section 92, but various method may be adopted such as fixing the elastic rubber section 91 to the inner diameter side of the rod guide 20 or fixing the elastic rubber section 91 to the inner diameter section of the cylinder 19.

As FIG. 3 shows a half cross section, a base section 92 of the friction member 22 has an annular shape including a flat perforated disk-shaped bottom section 101, and an annular tube-shaped tube section 102 which extends in the axial direction from an outer peripheral side of the bottom section 101. The tube section 102 extends from the outer peripheral side of the bottom section 101 to only one side in the axial direction. The bottom section 101 has a central axis aligned with that of the tube section 102, and the tube section 102 extends perpendicularly with respect to the bottom section 101. The base section 92 is formed of, for example, a planar material by, for example, press forming.

The bottom section 101 includes an inner bottom surface 103 formed of a circular flat surface on the side of the tube section 102 in the axial direction, an inner end surface 104 formed of an annular tube surface on a side opposite to the tube section 102 in the radial direction, and an outer bottom surface 105 formed of an circular flat surface on a side opposite to the tube section 102 in the axial direction. An inner peripheral end section of the inner bottom surface 103 is connected to one axial end section of the inner end surface 104. An inner peripheral end section of the outer bottom surface 105 is connected to the other axial end section of the inner end surface 104.

The tube section 102 includes an inner peripheral surface 106 formed of an annular tube surface on a side of the bottom section 101 in the radial direction, a tip surface 107 formed of a circular flat surface on a side opposite to the axial bottom section 101, and an outer peripheral surface 108 formed of an annular tube surface on the side opposite to the bottom section 101 in the radial direction. An end section of the inner peripheral surface 106 on the side opposite to the bottom section 101 in the axial direction is connected to an inner diameter section of the tip surface 107. An end section of the outer peripheral surface 108 on the side opposite to the bottom section 101 in the axial direction is connected to an outer diameter section of the tip surface 107. An annular inside R chamfer 109 is formed on a mutually close side between the inner bottom surface 103 and the inner peripheral surface 106. An annular outside R chamfer 110 is also formed on a mutually close side between the outer bottom surface 105 and the outer peripheral surface 108.

In the base section 92, the inner end surface 104, the inner peripheral surface 106, and the outer peripheral surface 108 have an aligned central axial line. The inner bottom surface 103, the outer bottom surface 105, and the tip surface 107 extend so as to be orthogonal to the central axial line. In the base section 92, an inner end having the smallest diameter configures the inner end surface 104 of the bottom section 101. Therefore, the inner end surface 104 has the smallest diameter in the bottom section 101 of the base section 92.

The elastic rubber section 91 has an annular shape having central axis aligned with that of the base section 92. The elastic rubber section 91 includes a main body section 121 that is formed on the inside of the tube section 102 of the base section 92 in the radial direction and on the side of the tube section 102 of the bottom section 101 in the axial direction, and an inner coated section 122 that extends to the outer side in the axial direction from the end section on the side of the bottom section 101 of the inner peripheral section of the main body section 121 in the axial direction to be formed on an inner peripheral side of the bottom section 101.

The main body section 121 is fixed to the inner peripheral surface 106 of the tube section 102 of the base section 92 on a tube section fixing surface 126 on the outer peripheral side, is fixed to an inside R chamfer 109 of the base section 92 on a corner fixing surface 127 connected to one side of the tube section fixing surface 126 in the axial direction, and is fixed to the inner bottom surface 103 of the bottom section 101 of the base section 92 on a bottom section fixing surface 128 connected to a side opposite to the tube section fixing surface 126 of the corner fixing surface 127.

The inner coated section 122 is fixed to the inner end surface 104 of the bottom section 101 of the base section 92 on an inner peripheral fixing surface 129 connected to a side opposite to the corner fixing surface 127 of the bottom section fixing surface 128. A part of the elastic rubber section 91, which is in contact with the base section 92, is entirely fixed to the base section 92.

The elastic rubber section 91 includes an exposed surface 135 exposed without being fixed to the base section 92 toward an opposite direction to the bottom section fixing surface 128 of the main body section 121 in the axial direction. In addition, the elastic rubber section 91 includes an inner peripheral surface 136 exposed without being fixed to the base section 92 on the inner peripheral side of the main body section 121 and the inner coated section 122.

The inner peripheral section of the elastic rubber section 91 includes a minimum inner diameter section 137 whose inner peripheral section becomes an minimum diameter in the friction member 22, a tapered first enlarged diameter section 138 and a second enlarged diameter section 139 whose diameters are enlarged to be larger diameters as being apart from the minimum inner diameter section 137 on both sides of the minimum inner diameter section 137 in the axial direction. The first enlarged diameter section 138 is disposed on a side closer to the exposed surface 135 in the axial direction. The second enlarged diameter section 139 is disposed on a side opposite to the exposed surface 135 in the axial direction. In addition, the elastic rubber section 91 includes a constant diameter section 140 which has a constant diameter and whose inner peripheral section is connected to a side opposite to the minimum inner diameter section 137 of the second enlarged diameter section 139, and a tapered section 145 connected to a side opposite to the second enlarged diameter section 139 of the constant diameter section 140. The tapered section 145 has a tapered shape whose diameter becomes smaller as being apart from the constant diameter section 140.

In other words, the elastic rubber section 91 is provided with, on the inner peripheral side, the minimum inner diameter section 137, the first enlarged diameter section 138 and the second enlarged diameter section 139 on the both sides of the minimum inner diameter section 137 in the axial direction, the constant diameter section 140, and the tapered section 145. A boundary part between the first enlarged diameter section 138 and the second enlarged diameter section 139 configures the minimum inner diameter section 137. The first enlarged diameter section 138 and the second enlarged diameter section 139 are arranged such that, in the axial direction of the elastic rubber section 91, the first enlarged diameter section 138 is disposed on a side far from the bottom section 101 of the base section 92, and the second enlarged diameter section 139 is disposed on a side close to the bottom section 101. In other words, the elastic rubber section 91 is provided with, on the inner peripheral side, the minimum inner diameter section 137, the first enlarged diameter section 138 whose diameter is enlarged toward a side opposite to the chamber 16 from the minimum inner diameter section 137, and the second enlarged diameter section 139 whose diameter is enlarged toward the chamber 16 from the minimum inner diameter section 137.

All of the minimum inner diameter section 137, the first enlarged diameter section 138, the second enlarged diameter section 139, the constant diameter section 140, and the tapered section 145 have an annular shape which is continuous over a whole periphery of the elastic rubber section 91 in the circumferential direction.

In the first embodiment, the first enlarged diameter section 138 includes a tapered enlarged diameter main body section 201 whose diameter is enlarged to be a larger diameter as being apart from the minimum inner diameter section 137, and a plurality of, specifically, four ribs 202 which are protruding sections that protrude inward in the radial direction beyond the enlarged diameter main body section 201. The rib 202 has an annular shape which is continuous over a whole periphery of an enlarged diameter main body section 201 in the circumferential direction, and has an annular shape around a central axial line of the enlarged diameter main body section 201. Therefore, all of the plurality of ribs 202 are formed in parallel.

The plurality of ribs 202 are disposed at equal intervals in the axial direction of the enlarged diameter main body section 201. The plurality of ribs 202 protrude equally inward in the radial direction from the enlarged diameter main body section 201. The plurality of ribs 202 protrude from the enlarged diameter main body section 201 such that a cross section of a surface including the central axial line becomes arcuate. The plurality of ribs 202 are formed in an intermediate range of the enlarged diameter main body section 201 in the axial direction. In other words, both end sections of the first enlarged diameter section 138 in the axial direction become the enlarged diameter main body sections 201.

The first enlarged diameter section 138 is formed with the plurality of ribs 202 at intervals, and thus a plurality of, specifically, three recessed grooves 203 are formed which are recessed sections recessed to the outside in the radial direction beyond the inner peripheral end sections of the ribs 202. The recessed groove 203 has an annular shape which is continuous over the whole periphery of the enlarged diameter main body section 201 in the circumferential direction, and has an annular shape around the central axial line of the enlarged diameter main body section 201. Therefore, all of the plurality of recessed grooves 203 are formed in parallel.

The plurality of recessed grooves 203 are disposed at equal intervals in the axial direction of the enlarged diameter main body section 201. The plurality of recessed grooves 203 are equally recessed inward in the radial direction from the inner peripheral end sections of the plurality of ribs 202. The plurality of recessed grooves 203 are formed in an intermediate range of the enlarged diameter main body section 201 in the axial direction.

As described above, the plurality of recessed grooves 203 and the plurality of ribs 202 are formed on the inner peripheral surface 211 of the first enlarged diameter section 138, in other words, a plurality of concavity and convexity are formed. The concavity and convexity are not formed on the second enlarged diameter section 139.

The inner peripheral surface 136 of the elastic rubber section 91 includes an inner peripheral surface 211 (first abutting surface) formed of a tapered surface of the first enlarged diameter section 138 with concavity and convexity, an inner peripheral surface 212 (second abutting surface) formed of a smooth tapered surface of the minimum inner diameter section 137 and the second enlarged diameter section 139 without the concavity and convexity, an inner peripheral surface 213 formed of a smooth annular tube surface of the constant diameter section 140 without the concavity and convexity, and an inner peripheral surface 214 formed of a smooth tapered surface of tapered section 145 without concavity and convexity. The inner peripheral surface 211 of the first enlarged diameter section 138 is provided from the first enlarged diameter section 138 to the minimum inner diameter section 137, and the inner peripheral surface 212 of the second enlarged diameter section 139 is provided from the minimum inner diameter section 137 to the second enlarged diameter section 139. The inner peripheral surface 211 of the first enlarged diameter section 138 includes a main body inner peripheral surface 215 formed of a smooth tapered surface of the enlarged diameter main body section 201 without concavity and convexity, and a protruding inner peripheral surface 216 of each of the plurality of ribs 202.

An end section of the first enlarged diameter section 138 on one side, the end section being on a side opposite to the minimum inner diameter section 137 in the axial direction of the main body inner peripheral surface 215, is connected to the exposed surface 135. An end section of the second enlarged diameter section 139 on the other end, the end section being on the side opposite to the minimum inner diameter section 137 of the tapered surface-shaped inner peripheral surface 212, is connected to the annular tubular inner peripheral surface 213 of the constant diameter section 140.

The minimum inner diameter section 137 is formed in the main body section 121, and an axial direction position thereof overlaps the tube section 102 of the base section 92. In other words, a position of the minimum inner diameter section 137 in the axial direction is shifted with respect to the bottom section 101 of the base section 92.

All of the plurality of ribs 202 are formed on the main body section 121, and all of the positions thereof in the axial direction overlap the tube section 102 of the base section 92. In other words, all of the plurality of ribs 202 are shifted in the axial direction with respect to the bottom section 101 of the base section 92.

As described above, the elastic rubber section 91 has the central axis aligned with that of the base section 92. Therefore, the exposed surface 135, the inner peripheral surface 211 of the first enlarged diameter section 138, the minimum inner diameter section 137, the inner peripheral surface 212 of the second enlarged diameter section 139, the inner peripheral surface 213 of the constant diameter section 140, and the inner peripheral surface 214 of the tapered section 145 have a central axis aligned with that of the base section 92. Therefore, the main body inner peripheral surface 215 of the enlarged diameter main body section 201 of the first enlarged diameter section 138 and the protruding inner peripheral surface 216 of the plurality of ribs 202 also have a central axis aligned with that of the base section 92. This central axis configures a central axis of the friction member 22. The plurality of ribs 202 of the first enlarged diameter section 138 has an annular shape which is continuous over a whole periphery of the friction member 22 in the circumferential direction around the central axis of the friction member 22, and are formed at intervals in the axial direction of the friction member 22.

The elastic rubber section 91 is formed with a recess-shaped section 151 that is recessed in a range which does not reach the bottom section 101 on the side of the bottom section 101 in the axial direction rather than a main surface section 150 on the inside of the exposed surface 135 in the radial direction on the side of the tube section 102 of the exposed surface 135 of the main body section 121, that is, on the outside in the radial direction. The main surface section 150 of the exposed surface 135 has an annular shape around the central axis of the friction member 22, and is formed of a circular flat surface disposed in a plane orthogonal to the central axis of the friction member 22. In addition, the recess-shaped section 151 is formed in an annular shape which is continuous over the whole periphery of the friction member 22 in the circumferential direction around the central axis of the friction member 22, and is formed to overlap a position with the side of the tube section 102 of the bottom section 101 in the radial direction.

The recess-shaped section 151 is formed to have a depth which is less than half a thickness of the main body section 121 in the axial direction.

The recess-shaped section 151 includes a recessed bottom surface 152 which has an arcuate shape in a cross section including the central line of the friction member 22 and is recessed on the side of the bottom section 101 in the axial direction, an outer extending surface 153 formed of a tapered surface that extends to be inclined such that a diameter thereof is enlarged to be a larger as being apart from the bottom section 101 on a side opposite to the bottom section 101 in the axial direction from an end section on the outside of the recessed bottom surface 152 in the radial direction, and an inner extending surface 154 formed of a tapered surface that extends to be inclined such that a diameter decreases as being apart from the bottom section 101 on the side opposite to the bottom section 101 in the axial direction from an end section of the recessed bottom surface 152 on the inside in the radial direction. In the recess-shaped section 151, an end section on the side of the bottom section 101 in the axial direction of the recessed bottom surface 152, that is, a bottom position becomes a deepest section 155 having the deepest depth. The recessed bottom surface 152, the outer extending surface 153, and the inner extending surface 154 are also formed around the central axis of the friction member 22. The deepest section 155 also has a circular shape around the central axis of the friction member 22.

The main body section 121 of the elastic rubber section 91 includes an extending section 160 which extends up to a shallow position in the axial direction rather than the deepest section 155 of the recess-shaped section 151 on the side of the tube section 102 in the radial direction of the recess-shaped section 151. The extending section 160 includes an inner peripheral surface formed of a part on the outside in the radial direction rather than deepest section 155 of the recessed bottom surface 152, and the outer extending surface 153, and an outer peripheral surface formed of a tube section fixing surface 126. An axial tip position of the extending section 160 is slightly closer to the side of the bottom section 101 than the main surface section 150, and is closer to the side of the bottom section 101 by a predetermined amount than the tip surface 107 of the tube section 102 of the base section 92. In other words, the inner peripheral surface 106 of the tube section 102 of the base section 92 is covered with the elastic rubber section 91 including the extending section 160, except for a part of the side of the tip surface 107.

A depth of the deepest section 155 of the recess-shaped section 151 is shallower than a position of the minimum inner diameter section 137 in the axial direction. That is, the deepest section 155 is positioned on the side opposite to the bottom section 101 rather than the minimum inner diameter section 137 in the axial direction of the friction member 22, and overlaps a position with the first enlarged diameter section 138. The plurality of ribs 202 of the first enlarged diameter section 138 overlap a position with the recess-shaped section 151 in the axial direction of the friction member 22.

In the elastic rubber section 91, an angle, which is formed by a line extending to be parallel to the central line of the friction member 22 from a boundary position between the main surface section 150 and the inner extending surface 154 toward the direction of the bottom section 101 and the inner extending surface 154, is larger than an angle which is formed by the line extending to be parallel to the central line of the friction member 22 from the minimum inner diameter section 137 toward the direction of the bottom section 101 and the inner peripheral surface 212 of the second enlarged diameter section 139. In other words, as an extending surface of the inner peripheral surface 212 of the second enlarged diameter section 139 on the side opposite to the bottom section 101 and the inner extending surface 154 of the recess-shaped section 151 inside in the radial direction approach in the radial direction as being apart from the bottom section 101 in the axial direction.

In the elastic rubber section 91, an angle, which is formed by the main body inner peripheral surface 215 of the first enlarged diameter section 138 and the inner peripheral surface 212 of the second enlarged diameter section 139, is an obtuse angle which is equal to or larger than 120°. The angle, which is formed by the line extending to be parallel to the central line of the friction member 22 from the minimum inner diameter section 137 toward the direction of the bottom section 101 and the inner peripheral surface 212 of the second enlarged diameter section 139, is larger than an angle which is formed by a line extending from the minimum inner diameter section 137 to be parallel to the central line of the friction member 22 in a direction opposite to the bottom section 101 and the main body inner peripheral surface 215.

As shown in FIG. 2, the friction member 22 having the above structure is fitted in the medium diameter hole section 56 from a side of the large diameter hole section 55 of the rod guide 20 in a posture in which the tube section 102 of the base section 92 protrudes to the outside in the cylinder inner and outer direction from the bottom section 101 of the base section 92. At this time, in the friction member 22, the tube section 102 of the base section 92 fits to the inner peripheral surface of the medium diameter hole section 56 on the outer peripheral surface 108, and the bottom section 101 abuts the bottom surface of the medium diameter hole section 56 on the outer bottom surface 105. On the inner peripheral side of the elastic rubber section 91, the first enlarged diameter section 138 is disposed on a side of the seal member 21 in the axial direction rather than the minimum inner diameter section 137, and the second enlarged diameter section 139 is disposed on a side opposite to the seal member 21 in the axial direction rather than the minimum inner diameter section 137, that is, on a side of the piston 18.

The main shaft section 38 of the piston rod 15 is inserted into the friction member 22 on the inside of the elastic rubber section 91 with a predetermined tightening allowance. Therefore, the friction member 22 adheres to the main shaft section 38 of the piston rod 15 while the elastic rubber section 91 is elastically deformed to the outside in the radial direction. Here, the friction member 22 adheres to the main shaft section 38 of the piston rod 15 at the minimum inner diameter section 137, a part of the first enlarged diameter section 138 on a side of the minimum inner diameter section 137, and a part of the second enlarged diameter section 139 on the side of the minimum inner diameter section 137, which are shown in FIG. 3. Further, when the piston rod 15 moves in the cylinder inner and outer direction, the elastic rubber section 91 slidably contacts with the piston rod 15. Here, the friction member 22 adjusts the friction characteristics.

As shown in FIG. 2, a communication path 161 is formed by the communication groove 58 formed in the medium diameter hole section 56 between the medium diameter hole section 56 of the rod guide 20 and the friction member 22 in a state in which the friction member 22 is fitted. The communication path 161 causes the small diameter hole section 57 of the rod guide 20 to communicate with the side of the large diameter hole section 55. That is, the communication path 161 causes a chamber 162, which is formed on the side of the medium diameter hole section 56 rather than the collar 62 in the small diameter hole section 57, to communicate with the chamber 85 on the side of the large diameter hole section 55, thereby reducing a pressure difference between the chambers. In other words, the communication path 161 causes both sides of the friction member 22 in the axial direction to communicate with each other to reduce the pressure difference between both sides of the friction member 22 in the axial direction.

The chamber 162 in the small diameter hole section 57 communicates with the chamber 16 through a minute gap between the collar 62 and the piston rod 15. Therefore, the communication path 161 causes the chamber 85 to communicate with the chamber 16, thereby reducing the pressure difference between the chambers. Therefore, the friction member 22 does not positively performs a role as a seal.

Note that, instead of or in addition to the communication path 161, a communication path may be provided which reduces the pressure difference between both sides of the inner periphery of the friction member 22 in the axial direction. In addition, the communication path 161 may not always perform communication, and, for example, may be provided with a check valve from the inside to the outside of the cylinder 19. That is, the friction member 22 may not act as a complete seal.

In a case where the piston rod 15 moves to a contraction side that contracts a whole length of the shock absorber 11, a part of the main shaft section 38 of the piston rod 15 on the side of the piston 18 enters the oil liquid in the inner tube 12. Thereafter, when the piston rod 15 moves to an extension side that extends the whole length of the shock absorber 11, the part that enters the oil liquid moves toward the outside of the cylinder 19 through the rod guide 20, the friction member 22, and the seal member 21. Here, although the oil liquid is attached to the outer peripheral surface 37 of the main shaft section 38, the oil liquid is finally scraped off by the oil lip 73 of the seal member 21 and is kept in the chamber 85.

In the friction member 22, the exposed surface 135 of the elastic rubber section 91, which is shown in FIG. 3, forms the chamber 85 shown in FIG. 2, and the inner peripheral surface 213 of the constant diameter section 140 and the inner peripheral surface 214 of the tapered section 145, which are shown in FIG. 3, form the chamber 162 shown in FIG. 2. Therefore, the side of the friction member 22 closer to the exposed surface 135 comes in contact with the oil liquid in the chamber 85, and a side of the friction member 22 closer to the tapered section 145 comes in contact with the oil liquid in the chamber 162.

The friction member 22 is elastically deformed by being pressed to the outside in the radial direction when the elastic rubber section 91 adheres to the main shaft section 38 of the piston rod 15. Then, the inner peripheral surface 211 of the first enlarged diameter section 138 shown in FIG. 3 abuts the outer peripheral surface 37 of the main shaft section 38, the inner peripheral surface 212 of the second enlarged diameter section 139 abuts the outer peripheral surface 37 of the main shaft section 38, and the minimum inner diameter section 137 between the first enlarged diameter section 138 and the second enlarged diameter section 139 abuts the outer peripheral surface 37 of the main shaft section 38.

As described above, in the shock absorber 11 of the first embodiment described above, when the piston rod 15 moves to the contraction side, the damping force having the orifice characteristics is generated by the not-shown fixed orifice in the region where the piston speed is slow. In the region where the piston speed is high, the disc valve 41 is apart from the piston 18, and thus the damping force having the valve characteristics is generated. When the piston rod 15 moves to the extension side, the damping force having the orifice characteristics is generated by the not-shown fixed orifice in the region where the piston speed is slow. In the region where the piston speed is high, the disc valve 42 is apart from the piston 18, and thus the damping force having the valve characteristics is generated.

Compared to an oil-pressure damping region where an oil-pressure damping force is generated by the not-shown fixed orifice and disc valves 41 and 42, basically, the damping force is hardly generated by the not-shown fixed orifice and disc valves 41 and 42 in a region where the piston speed is further slow. Therefore, the elastic force and the frictional resistance, which are always generated by the seal member 21 and the friction member 22, with respect to the piston rod 15, and the frictional resistance of the piston 18 with respect to the inner tube 12 are main generation sources of the damping force. In such a friction region, it is possible to optimize an acting force, that is, an axial force on the piston rod 15, by setting the friction member 22.

When the piston rod 15 moves to the extension side, the piston rod 15 moves to the outside in the cylinder inner and outer direction with respect to the base section 92 of the friction member 22, that is, to a side of the seal member 21. Then, the elastic rubber section 91 of the friction member 22 is deformed to the side of the seal member 21 in such a way that the minimum inner diameter section 137, the part of the first enlarged diameter section 138 on the side of the minimum inner diameter section 137, and the part of the second enlarged diameter section 139 on the side of the minimum inner diameter section 137, which are shown in FIG. 3 and which adhere to the main shaft section 38 of the piston rod 15, move together with the outer peripheral surface 37 of the main shaft section 38 due to friction.

Here, since the elastic rubber section 91 is supported by the base section 92, a moment is generated in a direction in which the first enlarged diameter section 138 weakens adhesion of the inner peripheral surface 211 to the outer peripheral surface 37 of the main shaft section 38 and the second enlarged diameter section 139 strengthens the adhesion of the inner peripheral surface 212 to the outer peripheral surface 37 of the main shaft section 38. As a result, in the elastic rubber section 91, a state is obtained in which the inner peripheral surface 212 of the second enlarged diameter section 139 becomes a dominant part to abut the outer peripheral surface 37 of the main shaft section 38. Further, in this state, the second enlarged diameter section 139 becomes the dominant part to slidably contacts with the outer peripheral surface 37 of the moving main shaft section 38. That is, in the friction member 22, when the piston rod 15 moves to the extension side, the inner peripheral surface 212 of the second enlarged diameter section 139 becomes a sliding surface with respect to the piston rod 15.

Here, the inner peripheral surface 212 of the second enlarged diameter section 139 that is slidably contacts with the piston rod 15 is not formed with a rib as in the first enlarged diameter section 138, that is, a recessed groove for holding the oil liquid, and thus the frictional force becomes large. In other words, since the inner peripheral surface 212 of the second enlarged diameter section 139 does not form an oil reservoir with the outer peripheral surface 37 of the main shaft section 38, it is not possible to suppress a friction coefficient μ, that is the frictional force, to a small value.

When the piston rod 15 moves to the contraction side, the piston rod 15 moves to the inside in the cylinder inner and outer direction, that is, to the side opposite to the seal member 21 with respect to the base section 92 of the friction member 22. Then, the elastic rubber section 91 of the friction member 22 is deformed to the side opposite to the seal member 21 in such a way that the minimum inner diameter section 137, the part of the first enlarged diameter section 138 on the side of the minimum inner diameter section 137, and the part of the second enlarged diameter section 139 on the side of the minimum inner diameter section 137, which adhere to the main shaft section 38 of the piston rod 15, move together with the outer peripheral surface 37 of the main shaft section 38 due to friction.

Here, since the elastic rubber section 91 is supported by the base section 92, a moment is generated in a direction in which the first enlarged diameter section 138 strengthens adhesion of the inner peripheral surface 211 to the outer peripheral surface 37 of the main shaft section 38 and the second enlarged diameter section 139 weakens the adhesion of the inner peripheral surface 212 to the outer peripheral surface 37 of the main shaft section 38. As a result, a state is obtained in which the inner peripheral surface 211 of the first enlarged diameter section 138 becomes the dominant part to abut the outer peripheral surface 37 of the main shaft section 38. Then, in this state, the first enlarged diameter section 138 becomes the dominant part to slidably contacts with the outer peripheral surface 37 of the moving main shaft section 38. That is, in the friction member 22, when the piston rod 15 moves to the contraction side, the inner peripheral surface 211 of the first enlarged diameter section 138 becomes a sliding surface with respect to the piston rod 15.

At this time, the plurality of ribs 202 are formed on the inner peripheral surface 211 of the first enlarged diameter section 138 that slidably contacts with the piston rod 15. Therefore, between the inner peripheral surface 211 of the first enlarged diameter section 138 and the outer peripheral surface 37 of the main shaft section 38, the oil liquid is held in the recessed groove 203 formed between the adjacent ribs 202, and thus the frictional force is suppressed to be smaller than a case where the piston rod 15 moves to the extension side. In other words, the inner peripheral surface 211 of the first enlarged diameter section 138 is formed with the recessed groove 203 that forms a plurality of oil reservoirs in the outer peripheral surface 37 of the main shaft section 38, so that it is possible to suppress the friction coefficient μ, that is the frictional force, to be small.

As described above, in the friction member 22, the inner peripheral surface 211, which is the abutting surface of the first enlarged diameter section 138 of the elastic rubber section 91 with respect to the piston rod 15, has a small frictional force, that is the friction coefficient compared to the inner peripheral surface 212 which is the abutting surface of the second enlarged diameter section 139 with respect to the piston rod 15. In other words, in the shock absorber 11 provided with the friction member 22, the axial force is applied to the piston rod 15 by the friction member 22 such that movement of the piston rod 15 in the outward direction of the cylinder 19 becomes difficult and movement of the piston rod 15 in the inward direction of cylinder 19 becomes easy. In other words, the friction member 22 applies a characteristic, in which the extension side has the axial force larger than the contraction side, to the piston rod 15.

Patent Document 1 described above discloses a liquid-pressure shock absorber which is provided with a friction member slidably contacts with a piston rod, and is provided with a communication path that communicates both sides of the friction member in the axial direction. In addition, Patent Document 2 described above discloses a friction member that includes an annular elastic rubber section and a metal base section formed of a perforated disk-shaped bottom section and an annular tube-shaped tube section as the friction member.

In the shock absorber using a friction member, the friction member generates a spring force due to elastic deformation of the rubber without generating slippage with the piston rod in the friction region where the piston speed starts to move from 0, and the spring force becomes an acting force (dynamic spring region). Thereafter, when the piston rod moves by a certain amount (0.1 mm) or more, the slippage occurs between the friction member and the piston rod, and thus the dynamic frictional force is generated (dynamic friction region).

In a case where the dynamic spring region is expanded and the dynamic friction region is reduced in the friction region, it is possible to smoothen the transition to the oil-pressure damping region and to increase a slope of the increase in the damping force with respect to the increase in the piston speed. As a result, a riding quality is improved by suppressing rough vibration of high frequency, and the force is generated at the start and the end of the roll, so that steering stability is further improved. In the shock absorber using the friction member of Patent Document 2, characteristics are changed such that the dynamic friction region is reduced and the damping force is smoothly increased as the piston speed is increased, and is smoothly transitioned to the oil-pressure damping force, and thus it is possible to obtain preferable damping force characteristics.

By the way, in a vehicle, in a case where the axial force on the contraction side of the shock absorber used in the suspension device is large, movement in which a sprung part supported by the shock absorber does not sink with respect to an unsprung part occurs, and thus there is a possibility that stroke feeling and yaw responsiveness of the shock absorber are deteriorated.

According to the shock absorber 11 of the first embodiment, the friction member 22 applies the axial force to the piston rod 15 such that the movement of the piston rod 15 in the outward direction of the cylinder 19 becomes difficult and the movement of the piston rod 15 in the inward direction of the cylinder 19 becomes easy. Therefore, the movement in which the sprung part connected to the unsprung part through the shock absorber 11 sinks with respect to the unsprung part hardly occurs, and thus the stroke feeling and the yaw responsiveness of the shock absorber 11 are improved. Therefore, it is possible to obtain preferable damping force characteristics.

In addition, in the friction member 22, the inner peripheral surface 211, which is the abutting surface of the elastic rubber section 91 with the piston rod 15 of the first enlarged diameter section 138, has the small frictional force, that is the friction coefficient μ, compared to the inner peripheral surface 212 which is the abutting surface of the second enlarged diameter section 139 with the piston rod 15. As just described, the friction member 22 applies the axial force to the piston rod 15 using the frictional force of the inner peripheral surface 211 of the elastic rubber section 91 and the frictional force of the inner peripheral surface 212 such that the movement of the piston rod 15 in the outward direction of the cylinder 19 becomes difficult and the movement of the piston rod 15 in the inward direction of the cylinder 19 becomes easy, and thus it is possible to apply the axial force to the piston rod 15 with a simple structure.

Specifically, in the elastic rubber section 91, a plurality of ribs 202 are formed on the inner peripheral surface 211 of the first enlarged diameter section 138 that slidably contacts hen the piston rod 15 moves to the contraction side, and the oil liquid is held in the plurality of recessed grooves 203 formed between the adjacent ribs 202, thereby the frictional force is suppressed to a small value. On the other hand, the elastic rubber section 91 is not formed with the ribs, that is, the recessed grooves on the inner peripheral surface 212 of the second enlarged diameter section 139 that is slidably contacts when the piston rod 15 moves to the extension side, and the frictional force becomes larger than a case where the piston rod 15 moves to the contraction side. As just described, in a case where the plurality of ribs 202 and the recessed grooves 203 are formed only on the inner peripheral surfaces 211 of the inner peripheral surfaces 211 and 212 of the elastic rubber section 91, the axial force is applied to the piston rod 15 such that the movement of the piston rod 15 in the outward direction of the cylinder 19 becomes difficult and the movement of the piston rod 15 in the inward direction of the cylinder 19 becomes easy, and thus it is possible to apply the axial force to the piston rod 15 with the simple structure.

In the above first embodiment, a case is described as an example in which the oil liquid is held by forming the plurality of annular ribs 202 on the inner peripheral surface 211 of the first enlarged diameter section 138 that slidably contacts when the piston rod 15 moves to the contraction side. However, a structural section may be provided which is capable of holding the oil liquid on the inner peripheral surface 211 of the first enlarged diameter section 138 that slidably contacts when the piston rod 15 moves to the contraction side. For example, it is possible to use a friction member 22a of modified example 1-1 shown in FIG. 4 and a friction member 22b of modified example 1-2 shown in FIG. 5.

Modified Example 1-1

Figure 4:
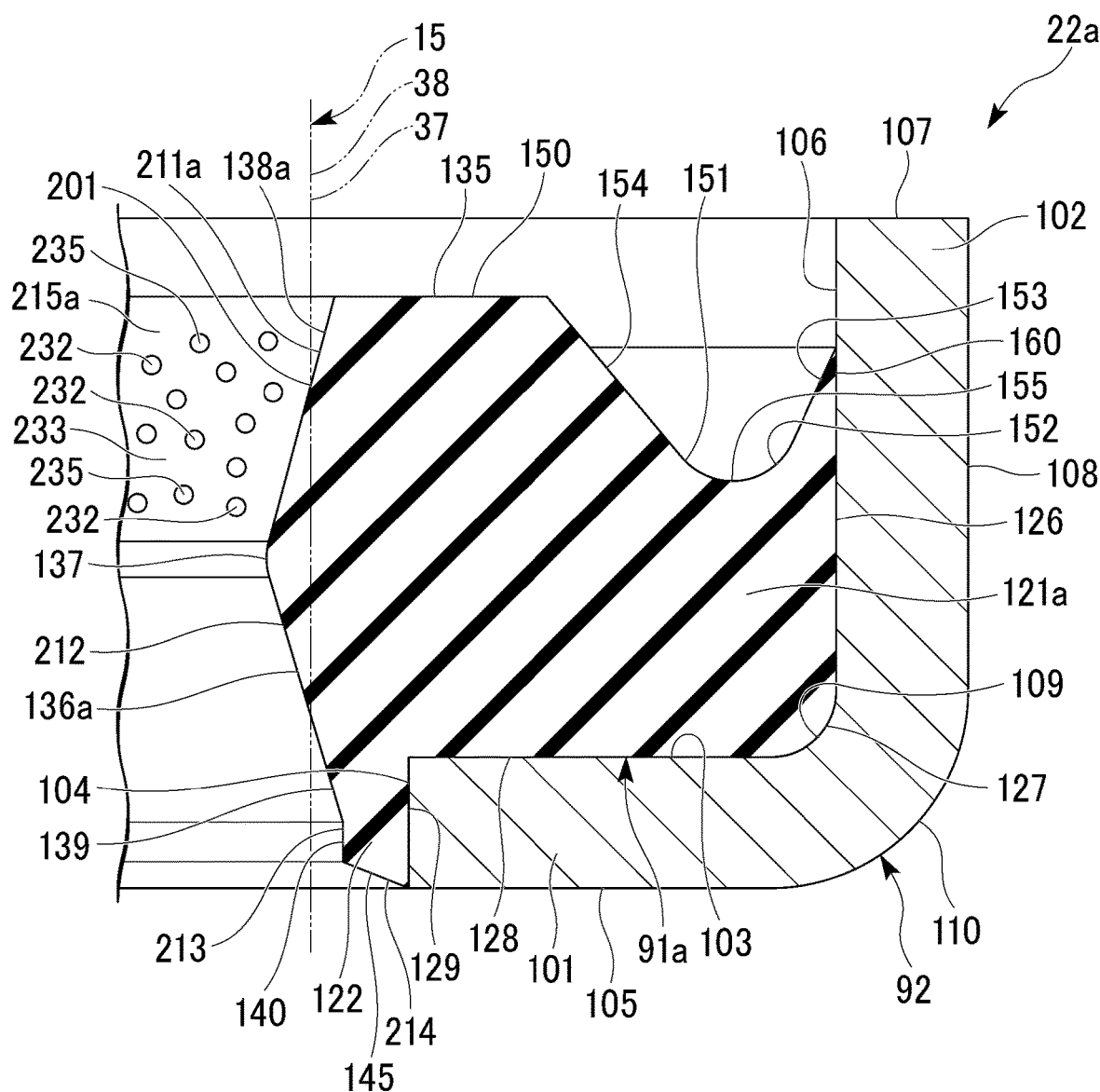
FIG. 4 is a half cross-sectional view showing a modified example 1-1 of the friction member of the shock absorber according to the first embodiment of the present invention.

As shown in FIG. 4, the friction member 22a of the modified example 1-1 includes an elastic rubber section 91a that is partially different from the elastic rubber section 91 of the friction member 22. FIG. 4 also shows the friction member 22a in a natural state before the piston rod 15 is inserted, and the outer peripheral surface 37 of the main shaft section 38 of the piston rod 15 when the piston rod 15 is inserted is represented by a virtual line (dashed line).

In the friction member 22a, a first enlarged diameter section 138a in a main body section 121a of the elastic rubber section 91a includes the enlarged diameter main body section 201 similar to the above, and a large number of granular protrusions 232 which are protruding sections that protrude inward in the radial direction beyond the enlarged diameter main body section 201. The protrusions 232 are disposed on the enlarged diameter main body section 201 at substantially uniform densities, and protrude equally inward in the radial direction from the enlarged diameter main body section 201. The protrusions 232 protrude from the enlarged diameter main body section 201 such that a cross section of a plane including the central axial line of the enlarged diameter main body section 201 becomes arcuate. The protrusions 232 are formed in an intermediate range of the enlarged diameter main body section 201 in the axial direction. In other words, both axial end sections of the first enlarged diameter section 138a are enlarged diameter main body sections 201.

The first enlarged diameter section 138a is formed with the plurality of protrusions 232 at intervals, and thus a plurality of recessed sections 233, which are recessed sections recessed to the outside in the radial direction beyond the protruding tip sections of the protrusions 232, are formed. The plurality of recessed sections 233 are continuous over a whole periphery of the enlarged diameter main body section 201 in the circumferential direction, and are continuous over a whole length of the enlarged diameter main body section 201 in the axial direction.

In the modified example 1-1, on an inner peripheral surface 211a (first abutting surface) of the first enlarged diameter section 138a of the inner peripheral surface 136a of the elastic rubber section 91a, the plurality of recessed sections 233 and the plurality of protrusions 232 are formed. In other words, the plurality of concavity and convexity are formed. The concavity and convexity are not formed on the second enlarged diameter section 139.

The inner peripheral surface 211a of the first enlarged diameter section 138a includes a smooth tapered surface-shaped main body inner peripheral surface 215a of the enlarged diameter main body section 201 without concavity and convexity, and a protruding inner peripheral surface 235 of each of the plurality of protrusions 232.

In a modified example 1-1, since the recessed section 233 capable of holding the oil liquid is formed on the inner peripheral surface 211a of the first enlarged diameter section 138a that slidably contacts when the piston rod 15 moves to the contraction side, it is possible to acquire advantageous effect similar to the above. Instead of the protrusions 232, a large number of recessed sections may be formed which are recessed outward in the radial direction from the main body inner peripheral surface 215a of the enlarged diameter main body section 201.

Modified Example 1-2

Figure 5:
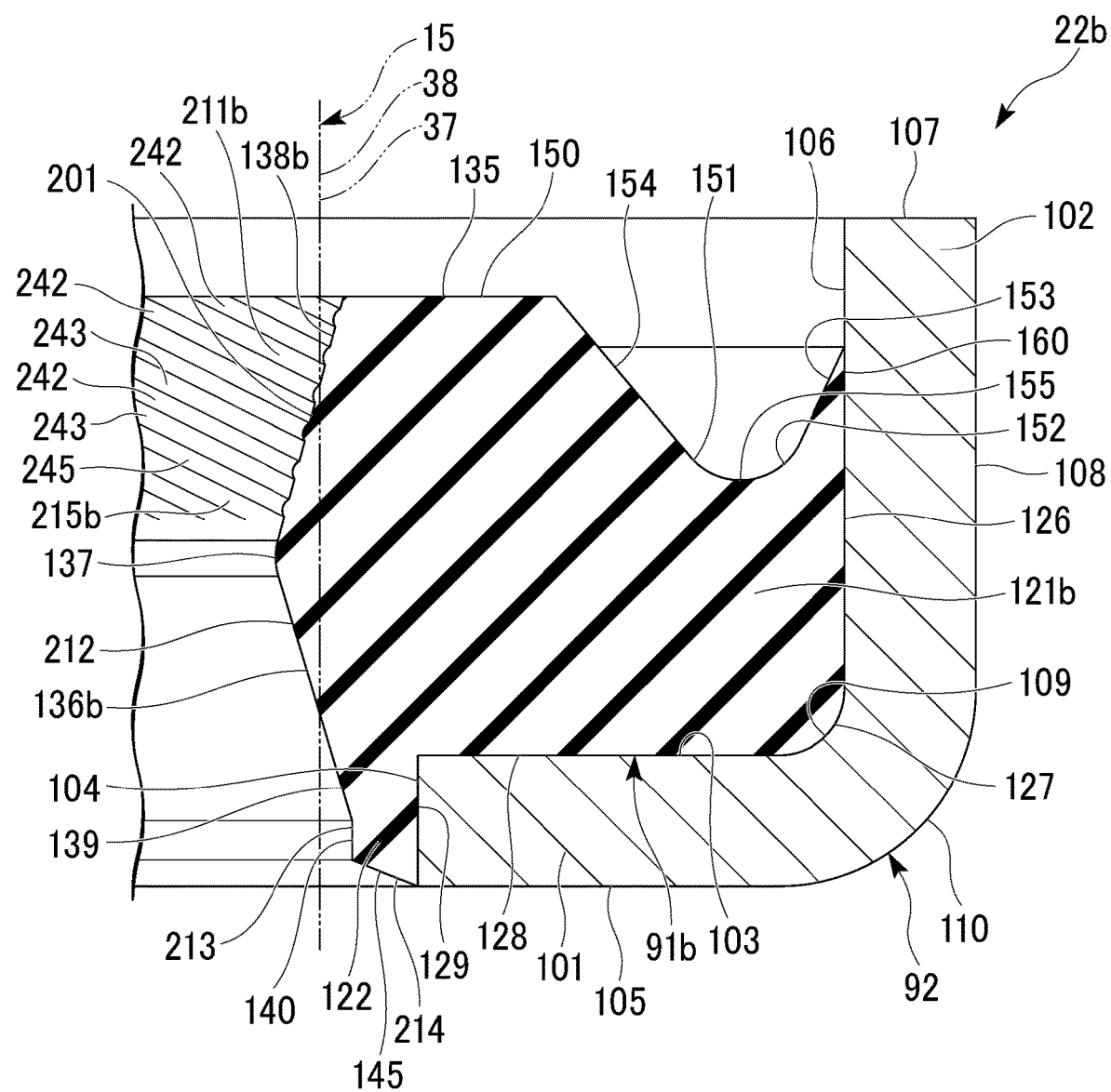
FIG. 5 is a half cross-sectional view showing a modified example 1-2 of the friction member of the shock absorber according to the first embodiment of the present invention.

As shown in FIG. 5, a friction member 22b of a modified example 1-2 includes an elastic rubber section 91b that is partially different from the elastic rubber section 91 of the friction member 22. FIG. 5 also shows the friction member 22b in a natural state before the piston rod 15 is inserted, and the outer peripheral surface 37 of the main shaft section 38 of the piston rod 15 when the piston rod 15 is inserted is drawn by a virtual line (dashed line).

In the friction member 22b, the first enlarged diameter section 138b in the main body section 121b of the elastic rubber section 91b includes the enlarged diameter main body section 201 similar to the above, and a plurality of inclined ribs 242 which are protruding sections that protrude inward in the radial direction beyond the enlarged diameter main body section 201. The inclined ribs 242 are inclined with respect to a surface orthogonal to the central axial line of the enlarged diameter main body section 201, and has an elliptical shape. All of the plurality of inclined ribs 242 are formed to be parallel.

The plurality of inclined ribs 242 are disposed at equal intervals in the axial direction of the enlarged diameter main body section 201, and protrude equally inward in the radial direction from the enlarged diameter main body section 201. The plurality of inclined ribs 242 protrude from the enlarged diameter main body section 201 such that a cross section of a plane including each central axial line becomes arcuate.

The plurality of inclined ribs 242 are formed in a range from an intermediate predetermined position in the axial direction of the enlarged diameter main body section 201 to the main surface section 150. In other words, an end section of the first enlarged diameter section 138b on the side of the minimum inner diameter section 137 in the axial direction is the enlarged diameter main body section 201.

The first enlarged diameter section 138b is formed with the plurality of inclined ribs 242 at intervals, and thus a plurality of inclined recessed grooves 243 which are recessed sections recessed on the outside in the radial direction beyond the inner peripheral end sections, are formed. The inclined recessed groove 243 is inclined with respect to a surface orthogonal to the central axial line of the enlarged diameter main body section 201, and has an elliptical shape.

The plurality of inclined recessed grooves 243 are disposed at equal intervals in the axial direction of the enlarged diameter main body section 201, and are equally recessed inward in the radial direction from the inner peripheral end sections of the plurality of inclined ribs 242. The plurality of inclined recessed grooves 243 are formed in a range from an intermediate predetermined position in the axial direction of the enlarged diameter main body section 201 to the main surface section 150.

In the modified example 1-2, the plurality of inclined recessed grooves 243 and the plurality of inclined ribs 242 are formed on an inner peripheral surface 211b (first abutting surface) of the first enlarged diameter section 138b of the inner peripheral surface 136b of the elastic rubber section 91b. In other words, the plurality of concavity and convexity are formed. The concavity and convexity are not formed on the second enlarged diameter section 139.

The inner peripheral surface 211b of the first enlarged diameter section 138b includes a smooth tapered surface-shaped main body inner peripheral surface 215b of the enlarged diameter main body section 201 without concavity and convexity, and a protruding inner peripheral surface 245 of each of the plurality of inclined ribs 242.

Also in the modified example 1-2, since the inclined recessed groove 243 capable of holding the oil liquid is formed on the inner peripheral surface 211b of the first enlarged diameter section 138b that is slidably in contact when the piston rod 15 moves to the contraction side, it is possible to acquire advantageous effect similar to the above.

Second Embodiment

Next, a second embodiment of the present invention will be described mainly based on FIG. 6 while focusing on differences from the first embodiment. Note that, parts common to the first embodiment are represented by the same names and the same reference numerals.

Figure 6:
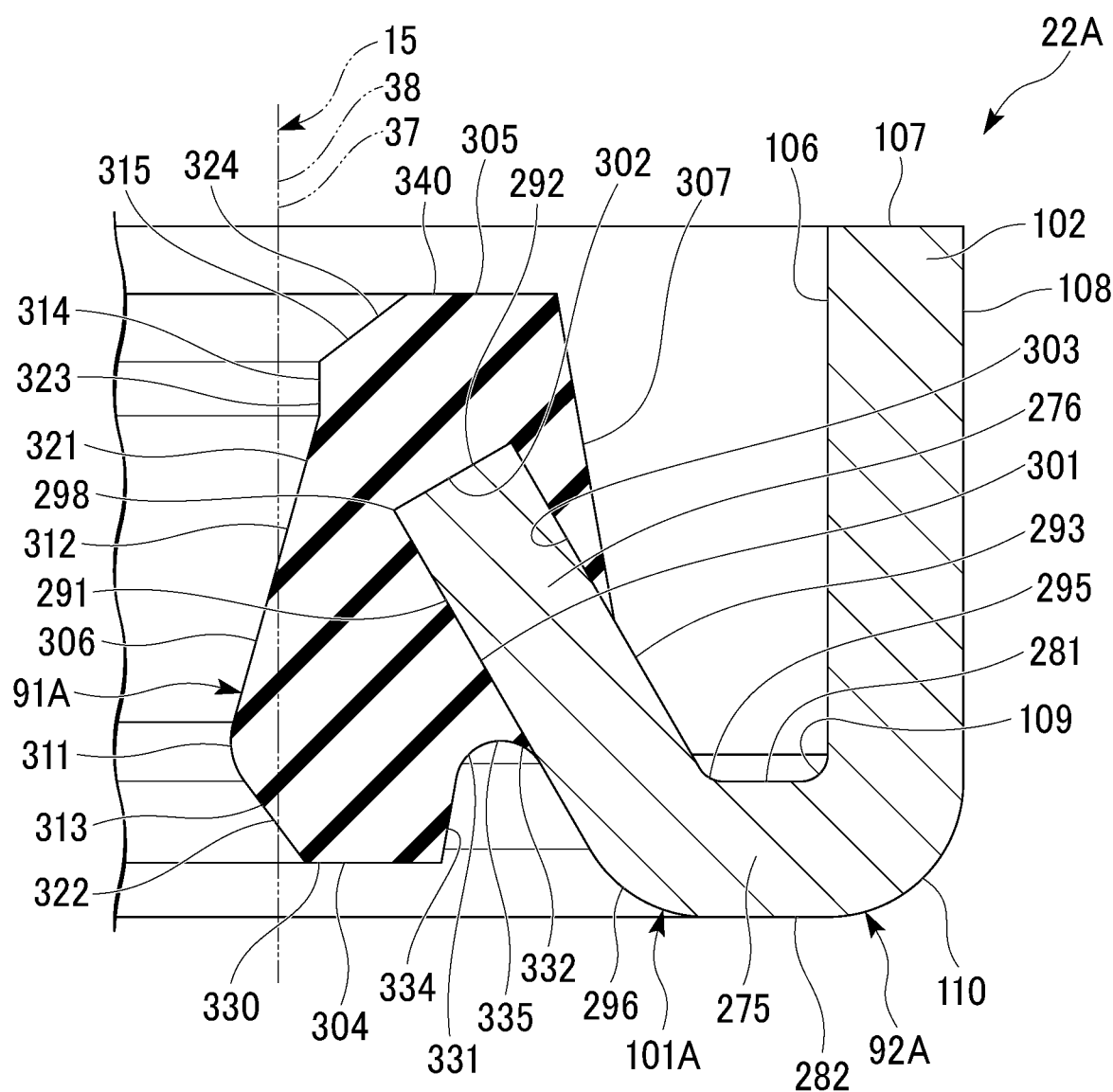
FIG. 6 is a half cross-sectional view showing a friction member of a shock absorber according to a second embodiment of the present invention.

In the second embodiment, instead of the friction member 22 of the first embodiment, a friction member 22A whose cross section on one side is shown in FIG. 6 is used. Note that, FIG. 6 also shows the friction member 22A in a natural state before the piston rod 15 is inserted, and the outer peripheral surface 37 of the main shaft section 38 of the piston rod 15 when the piston rod 15 is inserted is shown by a virtual line (dashed line).

The friction member 22A has an annular shape, and the piston rod 15 is slidably inserted into the inside of the friction member 22A. The friction member 22A slidably contacts with the outer peripheral section of the piston rod 15 at the inner peripheral section thereof, and generates the frictional resistance with respect to the piston rod 15.

The friction member 22A is also fitted in the medium diameter hole section 56 of the rod guide 20 shown in FIG. 2. Therefore, the friction member 22A is disposed further inside of the cylinder 19 than the seal member 21. The friction member 22A is in pressure contact with the outer peripheral surface 37 of the main shaft section 38 of the piston rod 15 at the inner peripheral section thereof, and generates the frictional resistance to the piston rod 15.

The friction member 22A is an integrally molded product formed of an annular elastic rubber section 91A formed of an elastic rubber material such as nitrile rubber or fluoro-rubber, and a metal annular base section 92A to which the elastic rubber section 91A is fixed. The friction member 22A is fitted in the medium diameter hole section 56 of the rod guide 20 shown in FIG. 2 in the base section 92A, and slidably contacts with the outer peripheral surface 37 of the main shaft section 38 of the piston rod 15 in the elastic rubber section 91A. The base section 92A maintains a shape of the elastic rubber section 91A and applies strength for fixing.

The friction member 22A has an annular shape including a base section 92A having a perforated disk-shaped bottom section 101A different from that of the first embodiment and a tube section 102 extending axially from an outer peripheral side of the bottom section 101A similar to that of the first embodiment. The base section 92A is formed from a flat material by, for example, press forming.

The bottom section 101A is formed of a flat perforated disk-shaped base plate section 275 and a tapered tube section 276 extending in an axial direction while reducing a diameter from an inner peripheral side of the base plate section 275. A tapered tube section 276 extends on the same side as the tube section 102 with respect to the base plate section 275 in the axial direction. The base plate section 275 and the tapered tube section 276, which form the bottom section 101A, have a central axis aligned with that of the tube section 102, and the tube section 102 extends perpendicularly to the base plate section 275.

The base plate section 275 includes an inner bottom surface 281 formed of a circular flat surface on the side of the tube section 102 in the axial direction, and an outer bottom surface 282 formed of an circular flat surface on a side opposite to the tube section 102 in the axial direction. An inside R chamfer 109 is formed on a mutually close side between the inner bottom surface 281 of the base plate section 275 and the inner peripheral surface 106 of the tube section 102, and an annular outside R chamfer 110 is formed on a mutually close side between the outer bottom surface 282 of the base plate section 275 and the outer peripheral surface 108 of the tube section 102.

The tapered tube section 276 includes an inner peripheral surface 291 formed of a tapered surface inside in the radial direction, a tip surface 292 formed of a tapered surface on a side opposite to the base plate section 275 in the axial direction, and an outer peripheral surface 293 formed of a tapered surface on the outside in the radial direction. An end section of the inner peripheral surface 291 on the side opposite to the base plate section 275 is connected to an inner diameter section of the tip surface 292. An end section of the outer peripheral surface 293 on the side opposite to the base plate section 275 is connected to an outer diameter section of the tip surface 292. An annular inside R chamfer 295 is formed on a mutually close side between the inner bottom surface 281 and the outer peripheral surface 293. An annular outside R chamfer 296 is formed on a mutually close side between the outer bottom surface 282 and the inner peripheral surface 291.

The outer peripheral surface 108, the inner peripheral surface 106, the outer peripheral surface 293, the tip surface 292, and the inner peripheral surface 291 have an aligned central axial line. The tip surface 107, the inner bottom surface 281, and the outer bottom surface 282 extend orthogonally to the central axial line. A boundary part between the inner peripheral surface 291 and the tip surface 292 of the tapered tube section 276 becomes the inner end section 298 having the smallest diameter of the base section 92A. The inner end section 298 has the smallest diameter also in the bottom section 101A of the base section 92A.

The elastic rubber section 91A has an annular shape having central axis aligned with that of the base section 92A, and is fixed to a part of a side of the tip surface 292 of the tapered tube section 276 of the base section 92A. The elastic rubber section 91A has a shape that wraps around the outer peripheral surface 293 from the inner peripheral surface 291 of the tapered tube section 276 of the base section 92A through the tip surface 292.

The elastic rubber section 91A is fixed to the inner peripheral surface 291 of the tapered tube section 276 on a fixing surface 301, is fixed to the tip surface 292 of the tapered tube section 276 on a fixing surface 302 connected to one axial side of the fixing surface 301, and is fixed to the outer peripheral surface 293 of the tapered tube section 276 on a fixing surface 303 connected to a side opposite to the fixing surface 301 of the fixing surface 302. A part, which is in contact with the base section 92A, of the elastic rubber section 91A, is entirely fixed to the base section 92A.

The elastic rubber section 91A includes an exposed surface 304 exposed without being fixed to the base section 92A at an end section on a side of the base plate section 275 in the axial direction, and an exposed surface 305 exposed without being fixed to the base section 92A at the end section on the side opposite to the base plate section 275 in the axial direction. In addition, the elastic rubber section 91A includes an inner peripheral surface 306 exposed without being fixed to the base section 92A on an inner peripheral side, and an outer peripheral surface 307 exposed without being fixed to the base section 92A on an outer peripheral side.

The inner peripheral section of the elastic rubber section 91A includes a minimum inner diameter section 311 having the minimum diameter in the friction member 22A, a tapered first enlarged diameter section 312 and a second enlarged diameter section 313 whose diameters are enlarged to be large diameters as being apart from the minimum inner diameter section 311 on both sides of the minimum inner diameter section 311 in the axial direction. The first enlarged diameter section 312 and the second enlarged diameter section 313 are arranged such that the first enlarged diameter section 312 is disposed on a side of the exposed surface 305 rather than the minimum inner diameter section 311 and the second enlarged diameter section 313 is disposed on a side opposite to the exposed surface 305 rather than the minimum inner diameter section 311. The elastic rubber section 91A includes a constant diameter section 314 which has a constant diameter and whose inner peripheral section is connected to a side opposite to the minimum inner diameter section 311 of the first enlarged diameter section 312, and a tapered section 315 that is connected to a side opposite to the first enlarged diameter section 312 of the constant diameter section 314 and whose diameter is enlarged to be a large diameter as being apart from the minimum inner diameter section 311.

In other words, the elastic rubber section 91A is provided with, on the inner peripheral side, the minimum inner diameter section 311, the first enlarged diameter section 312 and the second enlarged diameter section 313 on both sides of the minimum inner diameter section 311 in the axial direction, the constant diameter section 314, and the tapered section 315, and a boundary part between the first enlarged diameter section 312 and the second enlarged diameter section 313 becomes the minimum inner diameter section 311. In other words, the elastic rubber section 91A is provided with, on the inner peripheral side, the minimum inner diameter section 311, the first enlarged diameter section 312 whose diameter is enlarged toward the side opposite to the chamber 16 from the minimum inner diameter section 311, and the second enlarged diameter section 313 whose diameter is enlarged toward the chamber 16 from the minimum inner diameter section 311.

All of the minimum inner diameter section 311, the first enlarged diameter section 312, the second enlarged diameter section 313, the constant diameter section 314, and the tapered section 315 have an annular shape which is continuous over the whole periphery of the elastic rubber section 91A in the circumferential direction. An inner peripheral surface 306 of the elastic rubber section 91A includes a tapered surface-shaped inner peripheral surface 321 of the first enlarged diameter section 312, the minimum inner diameter section 311, a tapered surface-shaped inner peripheral surface 322 of the second enlarged diameter section 313, an annular tube surface-shaped inner peripheral surface 323 of the constant diameter section 314, and a tapered surface-shaped inner peripheral surface 324 of the tapered section 315. The inner peripheral surface 321 and the inner peripheral surface 322, the inner peripheral surface 323, and the inner peripheral surface 324 have the central axial line aligned with that of the base section 92A. The inner peripheral surface 321 of the first enlarged diameter section 312 is provided between the first enlarged diameter section 312 and the minimum inner diameter section 311, and the inner peripheral surface 322 of the second enlarged diameter section 313 is provided between the minimum inner diameter section 311 and the second enlarged diameter section 313.

An end section of the inner peripheral surface 324 of the tapered section 315 on a side opposite to the constant diameter section 314 is connected to the exposed surface 305, and an end section of the inner peripheral surface 322 of the second enlarged diameter section 313 on the side opposite to the minimum inner diameter section 311 is connected to the exposed surface 304.

In the second embodiment, a position of the minimum inner diameter section 311 of the elastic rubber section 91A in the axial direction is shifted with respect to the inner end section 298 of the base section 92A, and is disposed on a side of the base plate section 275 rather than the inner end section 298 in the axial direction. In other words, in the elastic rubber section 91A, a position of the first enlarged diameter section 312 overlaps in the axial direction with respect to the inner end section 298 of the bottom section 101A of the base section 92A, and both the minimum inner diameter section 311 and the second enlarged diameter section 313 are disposed to be shifted to a side of the base plate section 275 in the axial direction.

Since the tapered tube section 276 of the base section 92A has the tapered shape, a distance in the radial direction between the minimum inner diameter section 311 of the elastic rubber section 91A and the base section 92A becomes the shortest with respect to the inner end section 298, and a distance with respect to a part where a position in the axial direction is aligned becomes longer than the above distance.

As described above, the elastic rubber section 91A has a central axis aligned with that of the base section 92A. Specifically, the exposed surfaces 304 and 305, the minimum inner diameter section 311, the inner peripheral surface 321 of the first enlarged diameter section 312, the inner peripheral surface 322 of the second enlarged diameter section 313, the inner peripheral surface 323 of the constant diameter section 314, the inner peripheral surface 324 of the tapered section 315 have a central axis aligned with that of the base section 92A. The central axis configures a central axis of the friction member 22A.

The elastic rubber section 91A is formed with a recess-shaped section 331 which is recessed on a side of the exposed surface 305 in the axial direction beyond the main surface section 330 on the outside in the radial direction of the exposed surface 304 on the side of the tapered tube section 276 of the exposed surface 304, that is, on the outside in the radial direction. The main surface section 330 has an annular shape around the central axis of the friction member 22A, and is formed of an annular flat surface disposed in a plane orthogonal to the central axis of the friction member 22A.

In addition, the recess-shaped section 331 has an annular shape which is continuous over a whole periphery of the friction member 22A around the central axis of the friction member 22A in the circumferential direction, and is formed to overlap a position with the tapered tube section 276 of the base section 92A in the radial direction.

The recess-shaped section 331 includes a recessed bottom surface 332 which has an arcuate shape in a cross section including a central line of the friction member 22A and which is recessed on a side of the exposed surface 305 in the axial direction, and an inner extending surface 334, which is formed of a tapered surface that extends to be inclined such that a diameter becomes small as being apart from the exposed surface 305, on a side opposite to the exposed surface 305 in the axial direction from an end section of the recessed bottom surface 332 on the inside of the radial direction. An end section of the inner extending surface 334 on a side opposite to the recessed bottom surface 332 is connected to an end section of the main surface section 330 on the outside in the radial direction. In the recess-shaped section 331, an end section on a side of the exposed surface 305 in the axial direction of the recessed bottom surface 332, that is, a bottom position becomes a deepest section 335 having the deepest depth. A position of the deepest section 335 in the axial direction is aligned with the minimum inner diameter section 311. The recessed bottom surface 332 and the inner extending surface 334 are formed around the central axis of the friction member 22A. The end section of the recessed bottom surface 332 on a side opposite to the inner extending surface 334 is connected to an intermediate position of the inner peripheral surface 291 of the tapered tube section 276 in the axial direction.

The exposed surface 305 of the elastic rubber section 91A has an annular shape around the central axis of the friction member 22A, and is formed of an annular flat surface disposed in a plane orthogonal to the central axis of the friction member 22A. The outer peripheral surface 307 of the elastic rubber section 91A on the outside in the radial direction is a tapered surface around the central axis of the friction member 22A, and extends to be inclined such that a diameter becomes large as being apart from the exposed surface 305 in the axial direction on the side of the base plate section 275 in the axial direction from the end section of the exposed surface 305 on the outside in the radial direction. The outer peripheral surface 307 is connected to a predetermined intermediate position of the outer peripheral surface 293 of the tapered tube section 276 in the axial direction.

The friction member 22A having the above structure is fitted from the side of the large diameter hole section 55 of the rod guide 20 to the medium diameter hole section 56 in a state in which the exposed surface 305 of the elastic rubber section 91A is disposed on the outside in the cylinder inner and outer direction and the exposed surface 304 of the elastic rubber section 91A and the base plate section 275 are disposed on the inside in the cylinder inner and outer direction (refer to FIG. 2). At this time, in the friction member 22A, the tube section 102 of the base section 92A fits to the inner peripheral surface of the medium diameter hole section 56 on the outer peripheral surface 108, and the base plate section 275 of the bottom section 101A abuts a bottom surface of the medium diameter hole section 56 on the outer bottom surface 282. The friction member 22A is disposed on the rod guide 20 in a direction in which the tube section 102 and the tapered tube section 276 extend to the outside in the cylinder inner and outer direction (upper side in FIG. 6) from the base plate section 275 of the base section 92A.

In the friction member 22A, the minimum inner diameter section 311 of the elastic rubber section 91A is positioned inside in the cylinder inner and outer direction rather than the inner end section 298 of the bottom section 101A of the base section 92A. In other words, in the friction member 22A, the position of the first enlarged diameter section 312 of the elastic rubber section 91A overlaps the inner end section 298 of the bottom section 101A of the base section 92A, and the minimum inner diameter section 311 and the second enlarged diameter section 313 are disposed on the side of the piston 18 (refer to FIG. 2).

In the friction member 22A in a state of being attached to the cylinder 19 through the rod guide 20, the main shaft section 38 of the piston rod 15 is inserted into the inside of the elastic rubber section 91A with a predetermined tightening allowance. Therefore, the friction member 22A adheres to the main shaft section 38 of the piston rod 15 while the elastic rubber section 91A is elastically deformed to the outside in the radial direction. At this time, since the tapered tube section 276 of the base section 92A has a tapered shape, a gap in the radial direction between the piston rod 15 and the base section 92A becomes narrower toward the outside in the cylinder inner and outer direction. Then, in a case where the piston rod 15 moves in the cylinder inner and outer direction, the elastic rubber section 91A slidably contacts with the piston rod 15. Here, the friction member 22A adjusts the friction characteristics.

Even when the friction member 22A is fitted to the rod guide 20, the communication path 161 causes the chamber 85 to communicate with the chamber 162.

The friction member 22A is elastically deformed by being pressed outward in the radial direction when the elastic rubber section 91A adheres to the main shaft section 38 of the piston rod 15. In the elastic rubber section 91A, the position of the first enlarged diameter section 312 in the axial direction overlaps with respect to the inner end section 298 of the base section 92A which supports the elastic rubber section 91A, and the minimum inner diameter section 311 and the second enlarged diameter section 313 are positioned on the side of the piston 18 in the axial direction. Thereby, when being pushed outward in the radial direction, a moment is generated in a direction in which the side of the exposed surface 304 moves outward in the radial direction substantially around the inner end section 298.

At this time, the tapered tube section 276 of the base section 92A has a tapered shape to be positioned outward in the radial direction toward the side of the exposed surface 304 in the axial direction, and the recess-shaped section 331 is formed on the outside in the radial direction rather than the exposed surface 304 of the elastic rubber section 91A. Therefore, the elastic rubber section 91A is elastically deformed so that the side of the exposed surface 304 moves outward in the radial direction around the inner end section 298, in other words, the diameter is enlarged.

Then, in the elastic rubber section 91A, a part of the inner peripheral surface 321 of the first enlarged diameter section 312 on the side of the minimum inner diameter section 311 abuts the outer peripheral surface 37 of the main shaft section 38. Here, a contact range of the elastic rubber section 91A with respect to the piston rod 15 is positioned on the side of the piston 18 in the axial direction rather than the inner end section 298 of the base section 92A as a whole.

In the second embodiment described above, when the piston rod 15 moves to an extension side, the piston rod 15 moves to the outside in the cylinder inner and outer direction (upper side in FIG. 6) with respect to the base section 92A of the friction member 22A, that is, the side of the seal member 21. Then, the elastic rubber section 91A of the friction member 22A receives a force in a direction from the piston rod 15 to the seal member 21 such that an adhesion part of the first enlarged diameter section 312 which adheres to the piston rod 15 moves together with the outer peripheral surface 37 of the main shaft section 38 due to friction. Here, in the elastic rubber section 91A, the minimum inner diameter section 311 and the second enlarged diameter section 313 are disposed on the side opposite to the seal member 21 with respect to the inner end section 298 of the base section 92A. Therefore, in the elastic rubber section 91A, a moment is generated in a direction of the seal member 21 substantially around the inner end section 298 (upper direction in FIG. 6), and inward in the radial direction (left direction in FIG. 6) at a part between the adhesion part with respect to the piston rod 15 and the inner end section 298.

Due to the moment, the surface pressure, that is, the tension force with respect to the piston rod 15 at the adhesion part of the elastic rubber section 91A with the piston rod 15 is increased. Moreover, since the inner peripheral surface 291 of the tapered tube section 276 of the base section 92A is a tapered surface whose diameter becomes small as being on a side of the seal member 21, a part of the elastic rubber section 91A which moves in the direction of the seal member 21 between the adhesion part and the tapered tube section 276 is compressed in the radial direction. Accordingly, the surface pressure, that is, the tension force with respect to the piston rod 15 at the adhesion part with the piston rod 15 of the elastic rubber section 91A is increased.

When the piston rod 15 moves to the contraction side, the piston rod 15 moves to the inside in the cylinder inner and outer direction (lower side in FIG. 6) with respect to the base section 92A of the friction member 22A, that is, on the side opposite to the seal member 21. Then, the adhesion part, which adheres to the main shaft section 38 of the piston rod 15, tries to move together with the outer peripheral surface 37 of the main shaft section 38 due to friction, and thus the elastic rubber section 91A of the friction member 22A receives a force in a direction opposite to the seal member 21 from the piston rod 15. Here, as described above, in the elastic rubber section 91A, the minimum inner diameter section 311 and the second enlarged diameter section 313 are disposed on the side opposite to the seal member 21 with respect to the inner end section 298 of the base section 92A. Therefore, in the elastic rubber section 91A, the moment is not generated outward in the radial direction (right direction in FIG. 6) substantially around the inner end section 298 at a part between the adhesion part to the piston rod 15 and the inner end section 298.

Therefore, an increase in the surface pressure, that is, the tension force of the adhesion part of the elastic rubber section 91A to the piston rod 15 is suppressed with respect to the piston rod 15. Moreover, since the recess-shaped section 331 is formed by overlapping a position in the axial direction on the outside in the radial direction of the adhesion part, the deformation allowance of the adhesion part outward in the radial direction becomes large, and thus the increase in the surface pressure, that is, the tension force with respect to the piston rod 15 is further suppressed.

That is, rather than a case where the piston rod 15 moves to the contraction side, in a case where the piston rod 15 moves to the extension side, the friction member 22A have high components of a rotational force which is generated on the elastic rubber section 91A due to the friction and faces inside the radial direction, that is, the piston rod 15. In other words, the friction member 22A applies the axial force to the piston rod 15 such that the movement of piston rod 15 in the outward direction of the cylinder 19 becomes difficult and the movement of the piston rod 15 in the inward direction of the cylinder 19 becomes easy. In other words, the friction member 22A applies a characteristic, in which the extension side has the axial force larger than the contraction side, to the piston rod 15.

According to the second embodiment, the friction member 22A applies the axial force to the piston rod 15 such that the movement of the piston rod 15 in the outward direction of the cylinder 19 becomes difficult and the movement of the piston rod 15 in the inward direction of cylinder 19 becomes easy. Therefore, as in the first embodiment, the movement in which the sprung part connected to the unsprung part through the shock absorber 11 sinks with respect to the unsprung part hardly occurs, and thus the stroke feeling and the yaw responsiveness of the shock absorber 11 are improved. Therefore, it is possible to obtain preferable damping force characteristics.

In addition, in the friction member 22A, the minimum inner diameter section 311 and the second enlarged diameter section 313 are disposed on the side of the piston 18, that is, the inside in the cylinder inner and outer direction with respect to the inner end section 298 of the base section 92A that supports the elastic rubber section 91A. Therefore, rather than a case where the piston rod 15 moves to the inward direction of the cylinder 19, in a case where the piston rod 15 moves to the outward direction of the cylinder 19, a force inward in the radial direction of the elastic rubber section 91A becomes large, and thus the tension force with respect to the piston rod 15 increases. As described above, in the friction member 22A, it is possible to apply the axial force to the piston rod 15 with a simple structure in which the minimum inner diameter section 311 and the second enlarged diameter section 313 are disposed on the side of the piston 18 with respect to the inner end section 298 of the base section 92A that supports the elastic rubber section 91A.

Figure 7:
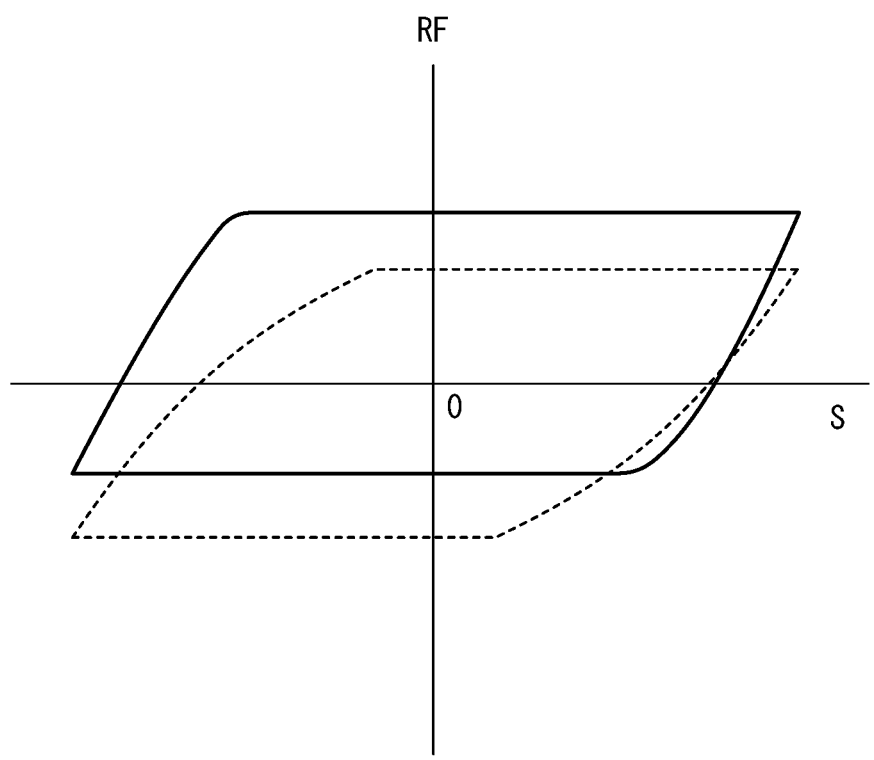
FIG. 7 is a diagram showing a result obtained by analyzing, by a finite element method, a relationship of a reaction force with respect to a stroke of the friction member of the shock absorber according to the second embodiment of the present invention.

Here, FIG. 7 represents a result obtaining, by a finite element method, the characteristics of the reaction force of the friction member with respect to the stroke of the piston rod. In FIG. 7, RF on a vertical axis shows the reaction force, and S on a horizontal axis shows the stroke of the piston rod. From FIG. 7, it is understood that characteristics of the friction member 22A of the second embodiment shown by a solid line, in which the tension force increases because the reaction force RF of an extension stroke (a region where the reaction force in FIG. 7 is on an upper side than 0) is apart from 0 rather than a related-art friction member shown by a broken line, and the tension force is suppressed because the reaction force RF of the contraction stroke (a region where the reaction force in FIG. 7 is on a lower side than 0) approaches 0.

In the above second embodiment, the elastic rubber section 91A of the friction member 22A may be configured such that the minimum inner diameter section 311 and the second enlarged diameter section 313 are disposed on the side of the piston 18 with respect to the inner end section 298 of the base section 92A. For example, it is possible to use a friction member 22Aa of a modified example 2-1 shown in FIG. 8, a friction member 22Ab of a modified example 2-2 shown in FIG. 9, and a friction member 22Ac of a modified example 2-3 shown in FIG. 10.

Modified Example 2-1

Figure 8:
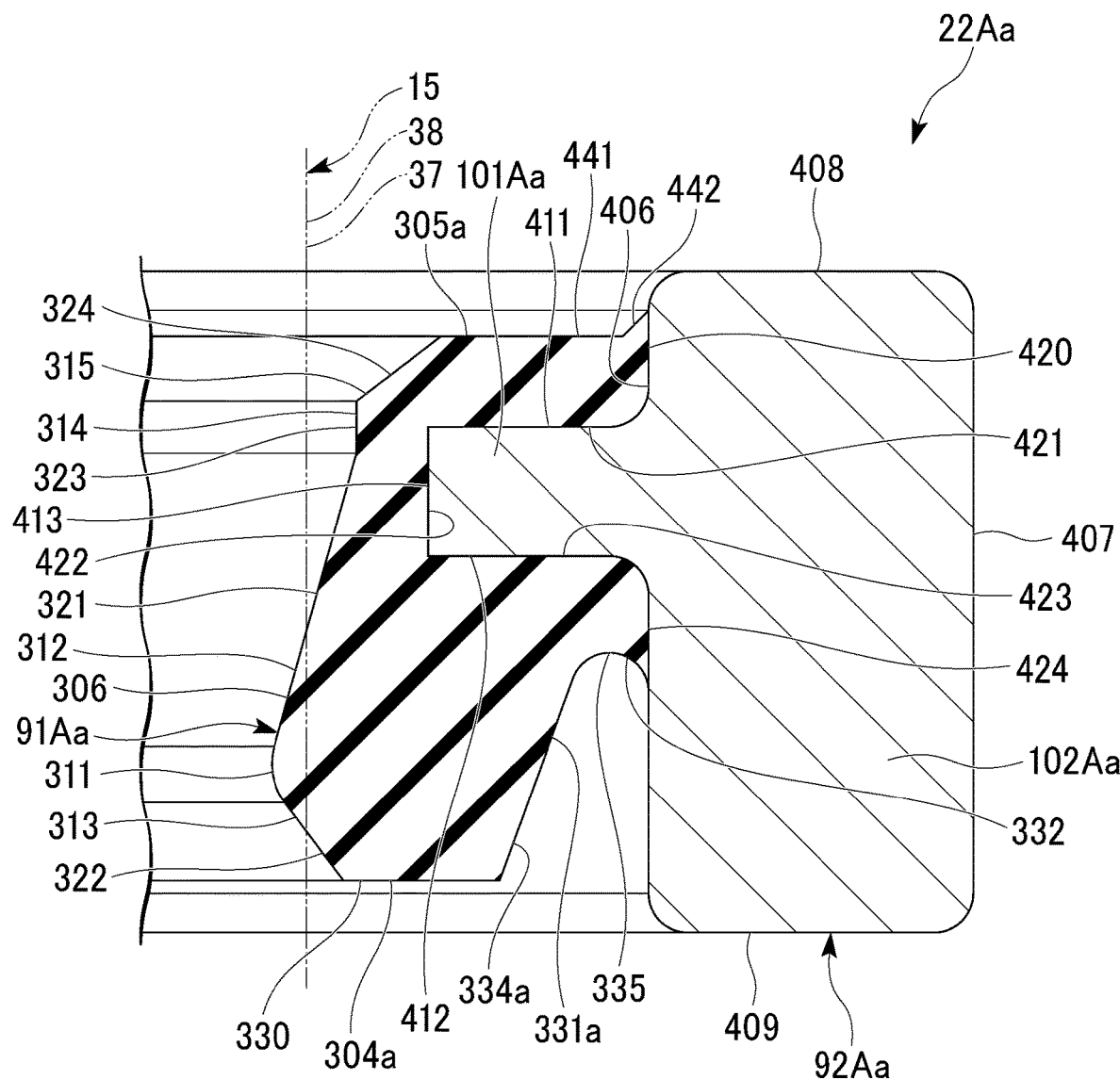
FIG. 8 is a half cross-sectional view showing a modified example 2-1 of the friction member of the shock absorber according to the second embodiment of the present invention.

As represented in FIG. 8, the friction member 22Aa of the modified example 2-1 includes a base section 92Aa different from the base section 92A. Note that, FIG. 8 also shows the friction member 22Aa in a natural state before the piston rod 15 is inserted, and the outer peripheral surface 37 of the main shaft section 38 of the piston rod 15 in a case where the piston rod 15 is inserted is a virtual line (dashed line).

The base section 92Aa has an annular shape including a flat perforated disk-shaped bottom section 101Aa, and an annular tube-shaped tube section 102Aa extending from an outer peripheral side of the bottom section 101Aa to both sides in the axial direction.

That is, the base section 92Aa includes the tube section 102Aa that protrudes from the perforated disk-shaped bottom section 101Aa toward the cylinder inner chamber 16. The base section 92Aa is formed of metal and is formed by, for example, forging. The base section 92Aa may be formed of a synthetic resin.

The tube section 102Aa includes an inner peripheral surface 406 formed of an annular tube surface on the inside in the radial direction, an outer peripheral surface 407 formed of an annular tube surface on the outside in the radial direction, a one end surface 408 formed of an annular flat surface on one side in the axial direction, and another end surface 409 formed of an annular flat surface on the other side in the axial direction. The inner peripheral surface 406 and the outer peripheral surface 407 are coaxially formed by aligning a central axial line. The one end surface 408 and the other end surface 409 extend orthogonally to the central axial line.

The bottom section 101Aa extends inward in the radial direction from a side of the axial one end surface 408 of the inner peripheral surface 406. The bottom section 101Aa includes a one end surface 411 formed of a circular flat surface on the side of the axial one end surface 408, another end surface 412 formed of a circular flat surface on a side of the other axial end surface 409, and an inner end surface 413 formed of an annular tube surface on the inside in the radial direction. An end section of the one end surface 411 on the inside in the radial direction is connected to the one axial end section of the inner end surface 413, and an end section of the other end surface 412 on the inside in the radial direction is connected to the other axial end section of the inner end surface 413. The inner end surface 413 is coaxially formed with the inner peripheral surface 406 and the outer peripheral surface 407 by aligning a central axial line. The one end surface 411 and the other end surface 412 extend orthogonally to the central axial line. In the base section 92Aa, the inner end surface 413 of the bottom section 101Aa is an inner end having the smallest diameter.

The friction member 22Aa has an elastic rubber section 91Aa that is partially different from the elastic rubber section 91A. The elastic rubber section 91Aa has an annular shape having central axis aligned with that of the base section 92Aa, and is fixed to the one end surface 411, the other end surface 412 and the inner end surface 413 of the bottom section 101Aa of the base section 92Aa, and a part on a side of the bottom section 101Aa of the inner peripheral surface 406 of the tube section 102A.

The elastic rubber section 91Aa is fixed to a side of the one end surface 408 of the inner peripheral surface 406 of the tube section 102A of the base section 92Aa by a fixing surface 420, is fixed to the end surface 411 of the bottom section 101Aa by a fixing surface 421 connected to one axial side of the fixing surface 420, is fixed to the inner end surface 413 of the bottom section 101Aa by a fixing surface 422 connected to the inside in the radial direction of the fixing surface 421, is fixed to the other end surface 412 of the bottom section 101Aa by a fixing surface 423 connected to a side opposite to the fixing surface 421 of the fixing surface 422, and is fixed to a side of the other end surface 409 of the inner peripheral surface 406 of the tube section 102A by a fixing surface 424 connected to a side opposite to the fixing surface 422 of the fixing surface 423. A part of the elastic rubber section 91Aa, which contacts with the base section 92Aa, is entirely fixed to the base section 92Aa. The elastic rubber section 91Aa has a shape that wraps around from the one end surface 411 of the bottom section 101Aa of the base section 92Aa to the other end surface 412 through the inner end surface 413.

The elastic rubber section 91Aa includes an exposed surface 304a exposed without being fixed to the base section 92Aa at an end section on the side of the other axial end surface 409, and an exposed surface 305a exposed without being fixed to the base section 92Aa at an end section on the side of the axial one end surface 408. In addition, the elastic rubber section 91Aa includes an inner peripheral surface 306 similar to the above, which is exposed on the inner peripheral side without being fixed to the base section 92Aa. Therefore, similar to the above, an inner peripheral section of the elastic rubber section 91Aa includes the minimum inner diameter section 311, the first enlarged diameter section 312, the second enlarged diameter section 313, the constant diameter section 314, and the tapered section 315.

An end section of the inner peripheral surface 324 of the tapered section 315 on a side opposite to the constant diameter section 314 is connected to the exposed surface 305a, and an end section of the inner peripheral surface 322 of the second enlarged diameter section 313 on the side opposite to the minimum inner diameter section 311 of the inner peripheral surface 322 is connected to the exposed surface 304a.

A position of the minimum inner diameter section 311 of the elastic rubber section 91Aa in the axial direction is shifted with respect to the inner end surface 413 of the bottom section 101Aa which is the inner end of the base section 92Aa, and is disposed on the side of the other end surface 409 in the axial direction rather than the inner end surface 413. In other words, in the elastic rubber section 91Aa, a position of the first enlarged diameter section 312 overlaps in the axial direction with respect to the inner end surface 413 of the bottom section 101Aa of the base section 92Aa, and both of the minimum inner diameter section 311 and the second enlarged diameter section 313 are disposed to be shifted to a side of the other end surface 409 in the axial direction.

The elastic rubber section 91Aa has the central axis aligned with that of the base section 92Aa. Specifically, the exposed surfaces 304a and 305a, the minimum inner diameter section 311, the inner peripheral surface 321 of the first enlarged diameter section 312, the inner peripheral surface 322 of the second enlarged diameter section 313, the inner peripheral surface 323 of the constant diameter section 314, and the inner peripheral surface 324 of the tapered section 315 have a central axis aligned with that of the base section 92Aa. The central axis becomes a central axis of the friction member 22Aa.

The exposed surface 304a of the elastic rubber section 91Aa has an annular shape around the central axis of the friction member 22Aa. The exposed surface 304a includes a main surface section 330 similar to the above, which is formed of an annular flat surface disposed in a plane orthogonal to the central axis of the friction member 22Aa outward in the radial direction, and is formed with a recess-shaped section 331a which is recessed on a side of the exposed surface 305a in the axial direction beyond the main surface section 330 on the outside in the radial direction of the main surface section 330. The recess-shaped section 331a includes a recessed bottom surface 332 similar to the recess-shaped section 331, and an inner extending surface 334a which is longer than the inner extending surface 334 of the recess-shaped section 331 in the axial direction. In the recess-shaped section 331a, a position of a deepest section 335 of the recessed bottom surface 332, which has the deepest depth, in the axial direction is positioned on a side of the exposed surface 305a rather than the minimum inner diameter section 311. An end section of the recessed bottom surface 332 on a side opposite to the inner extending surface 334a is connected to an intermediate position between the bottom section 101Aa of the inner peripheral surface 406 of the tube section 102Aa and the other end surface 409.

The exposed surface 305a of the elastic rubber section 91Aa has an annular shape around the central axis of the friction member 22Aa. The exposed surface 305a is formed of a main surface section 441 formed of an annular flat surface disposed in a plane orthogonal to the central axis of the friction member 22Aa, and a tapered surface section 442 connected to an outer peripheral edge section of the main surface section 441. The tapered surface section 442 extends in a tapered surface shape so as to be positioned on a side opposite to the exposed surface 304a in the axial direction toward the outside in the radial direction. The main surface section 441 is connected to the inner peripheral surface 324 of the tapered section 315, and the tapered surface section 442 is connected to an intermediate position between the bottom section 101Aa of the inner peripheral surface 406 of the tube section 102A and the one end surface 408.

The friction member 22Aa having such a structure is also fitted in the medium diameter hole section 56 from a side of the large diameter hole section 55 of the rod guide 20 in a state in which the exposed surface 305a of the elastic rubber section 91Aa is disposed on the outside in the cylinder inner and outer direction and the exposed surface 304a of the elastic rubber section 91Aa is disposed on the inside in the cylinder inner and outer direction (refer to FIG. 2). At this time, in the friction member 22Aa, the tube section 102Aa of the base section 92Aa fits to the inner peripheral surface of the medium diameter hole section 56 on the outer peripheral surface 407, and abuts a bottom surface of the medium diameter hole section 56 on the other end surface 409.

In this state, in the friction member 22Aa, a side of the minimum inner diameter section 311 of the elastic rubber section 91Aa is positioned on the inside in the cylinder inner and outer direction rather than the inner end surface 413 which is an inner end of the bottom section 101Aa of the base section 92Aa. In other words, in the friction member 22Aa, a position of the first enlarged diameter section 312 of the elastic rubber section 91Aa in the axial direction overlaps with respect to the inner end surface 413 of the bottom section 101Aa of the base section 92Aa, and the minimum inner diameter section 311 and the second enlarged diameter section 313 are disposed on the side of the piston 18.

Therefore, in the friction member 22Aa, in a case where the piston rod 15 moves to the extension side (upper side in FIG. 8), a moment is generated in the direction of the seal member 21 (upper direction represented in FIG. 8) substantially around an end section on a side of the other end surface 412 of the inner end surface 413 and inward in the radial direction (left direction represented in FIG. 8) at a part between the adhesion part of the elastic rubber section 91Aa to the piston rod 15 and an end section of the inner end surface 413 on the side of the other end surface 412 similar to the friction member 22A, and thus the surface pressure, that is, the tension force with respect to the piston rod 15 at the adhesion part of the elastic rubber section 91Aa with respect to the piston rod 15 is increased.

In addition, in the friction member 22Aa, in a case where the piston rod 15 moves to the contraction side (lower side in FIG. 8), the moment is not generated outward in the radial direction (right direction shown in FIG. 8) at a part between the adhesion part of the elastic rubber section 91Aa to the piston rod 15 and the end section on the side of the other end surface 412 of the inner end surface 413, and thus the increase in the surface pressure, that is, the tension force with respect to the piston rod 15 at the adhesion part of the elastic rubber section 91Aa to the piston rod 15 is suppressed.

That is, similar to the friction member 22A, rather than a case where the piston rod 15 moves to the contraction side, in a case where the piston rod 15 moves to the extension side, the friction member 22Aa have high components of a rotational force which is generated on the elastic rubber section 91Aa due to the friction and faces inside the radial direction, that is, the piston rod 15. In other words, the friction member 22Aa applies the axial force to the piston rod 15 such that the movement of the cylinder 19 in the outward direction becomes difficult and the movement of the cylinder 19 in the inward direction becomes easy.

Modified Example 2-2

Figure 9:
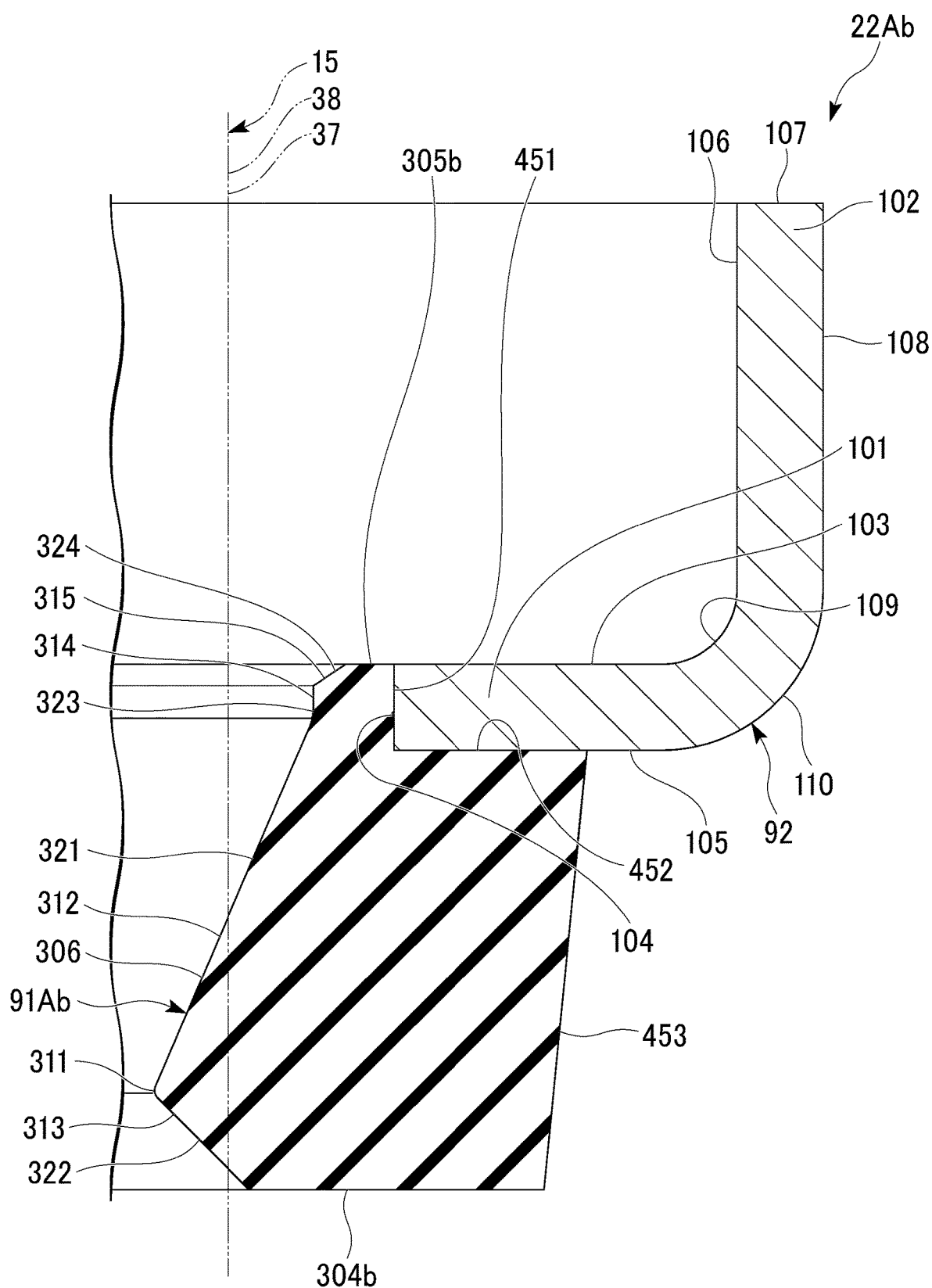
FIG. 9 is a half cross-sectional view showing a modified example 2-2 of the friction member of the shock absorber according to the second embodiment of the present invention.

As shown in FIG. 9, an elastic rubber section 91Ab that is partially different from the elastic rubber section 91A is provided such that a friction member 22Ab of a modified example 2-2 protrudes on a side opposite to the tube section 102 in the axial direction on the inner peripheral side of the bottom section 101 of the base section 92, which is substantially the same as that of the first embodiment. Note that, FIG. 9 also shows the friction member 22Ab in a natural state before the piston rod 15 is inserted, and the outer peripheral surface 37 of the main shaft section 38 of the piston rod 15 when the piston rod 15 is inserted is shown by a virtual line (dashed line).

The elastic rubber section 91Ab includes a fixing surface 451 fixed to the inner end surface 104 of the bottom section 101, and a fixing surface 452 fixed to the outer bottom surface 105 of the bottom section 101. A part of the elastic rubber section 91Ab, which is in contact with the base section 92, is entirely fixed to the base section 92.

The elastic rubber section 91Ab includes an exposed surface 304b exposed without being fixed to the base section 92 at an end section on a side opposite to the tube section 102 in the axial direction, and an exposed surface 305b exposed without being fixed to the base section 92 at an end section on the side of the tube section 102 in the axial direction. In addition, the elastic rubber section 91Ab includes an inner peripheral surface 306 similar to the above, which is exposed on the inner peripheral side without being fixed to the base section 92. Therefore, similar to the above, an inner peripheral section of the elastic rubber section 91Ab includes the minimum inner diameter section 311, the first enlarged diameter section 312, the second enlarged diameter section 313, the constant diameter section 314, and the tapered section 315.

An end section of the inner peripheral surface 324 of the tapered section 315 on a side opposite to the constant diameter section 314 is connected to the exposed surface 305b.

The position of the minimum inner diameter section 311 of the elastic rubber section 91Ab in the axial direction is shifted with respect to the inner end surface 104 of the bottom section 101 which is the inner end of the base section 92, and is disposed on a side opposite to the tube section 102 in the axial direction rather than the inner end surface 104. In other words, in the elastic rubber section 91Ab, a position of the first enlarged diameter section 312 overlaps in the axial direction with respect to the inner end surface 104 of the bottom section 101 of the base section 92, and both the minimum inner diameter section 311 and the second enlarged diameter section 313 are disposed to be shifted to a side opposite to the tube section 102 in the axial direction.

The elastic rubber section 91Ab includes an outer peripheral surface 453 formed of a tapered surface extending to enlarge the diameter toward the side of the exposed surface 305b in the axial direction from the outer peripheral edge section of the exposed surface 304b. The outer peripheral surface 453 is connected to the outer bottom surface 105 of the bottom section 101 of the base section 92. In addition, in the elastic rubber section 91Ab, the exposed surface 305b is connected to the inner bottom surface 103 of the bottom section 101.

The elastic rubber section 91Ab has the central axis aligned with that of the base section 92. Specifically, the exposed surfaces 304b and 305b, the minimum inner diameter section 311, the inner peripheral surface 321 of the first enlarged diameter section 312, the inner peripheral surface 322 of the second enlarged diameter section 313, the inner peripheral surface 323 of the constant diameter section 314, the inner peripheral surface 324 of the tapered section 315, and the outer peripheral surface 453 have a central axis aligned with that of the base section 92Aa. The central axis becomes a central axis of the friction member 22Aa.

The exposed surface 304b of the elastic rubber section 91Ab has an annular shape around the central axis of the friction member 22Ab. The exposed surface 304b is formed of an annular flat surface disposed in a surface orthogonal to the central axis of the friction member 22Ab.

The exposed surface 305b of the elastic rubber section 91Ab has an annular shape around the central axis of the friction member 22Ab. The exposed surface 305b is formed of an annular flat surface disposed in a plane orthogonal to the central axis of the friction member 22Ab. The exposed surface 305b is disposed on the same plane as the inner bottom surface 103 of the base section 92 and is connected to the inner bottom surface 103.

The friction member 22Ab having such a structure is also fitted in the medium diameter hole section 56 from a side of the large diameter hole section 55 of the rod guide 20 in a state in which the exposed surface 305b of the elastic rubber section 91Ab is disposed on the outside in the cylinder inner and outer direction and the exposed surface 304b of the elastic rubber section 91Ab is disposed on the inside in the cylinder inner and outer direction. Here, the rod guide 20 is formed with a hole section which accommodates the elastic rubber section 91Ab on the side of the piston 18 of the medium diameter hole section 56 in the axial direction. Further, in the friction member 22Ab, the tube section 102 of the base section 92 fits to the inner peripheral surface of the medium diameter hole section 56 on the outer peripheral surface 108, and the bottom section 101 abuts on the bottom surface of the medium diameter hole section 56 on the outer bottom surface 105.

In this state, in the friction member 22Ab, a side of the minimum inner diameter section 311 of the elastic rubber section 91Ab is positioned inside in the cylinder inner and outer direction rather than the inner end surface 104 which is the inner end of the bottom section 101 of the base section 92. In other words, in the friction member 22Ab, the minimum inner diameter section 311 and the second enlarged diameter section 313 of the elastic rubber section 91Ab are disposed on the side of the piston 18, that is, the side of the chamber 16 in the axial direction with respect to the inner end surface 104 of the bottom section 101 of the base section 92.

Therefore, in the friction member 22Ab, in a case where the piston rod 15 moves to the extension side (upper side in FIG. 9), similar to the friction member 22A, a moment is generated in the direction of the seal member 21 (upper direction in FIG. 9) substantially around an end section of the inner end surface 104 on a side of the outer bottom surface 105 and inward in the radial direction (left direction in FIG. 9) at a part between the adhesion part of the elastic rubber section 91Ab to the piston rod 15 and the end section of the inner end surface 104 on a side of the outer bottom surface 105, and thus the surface pressure, that is, the tension force with respect to the piston rod 15 at the adhesion part of the elastic rubber section 91Ab to the piston rod 15 is increased.

In addition, in the friction member 22Ab, in a case where the piston rod 15 moves to the contraction side, the moment is not generated inward in the radial direction substantially around the end section on the side of the outer bottom surface 105 of the inner end surface 104 at a part between the adhesion part of the elastic rubber section 91Ab to the piston rod 15 and the end section on the side of the outer bottom surface 105 of the inner end surface 104. Therefore, an increase in the surface pressure, that is, the tension force to the piston rod 15 at the adhesion part of the elastic rubber section 91Ab to the piston rod 15 is suppressed.

That is, similar to the friction member 22A, rather than a case where the piston rod 15 moves to the contraction side, in a case where the piston rod 15 moves to the extension side, the friction member 22Ab have high components of a rotational force which is generated on the elastic rubber section 91Ab due to the friction and faces inside the radial direction, that is, the piston rod 15. In other words, the friction member 22Ab applies the axial force to the piston rod 15 such that the movement of the cylinder 19 in the outward direction becomes difficult and the movement of the cylinder 19 in the inward direction becomes easy.

Modified Example 2-3

Figure 10:
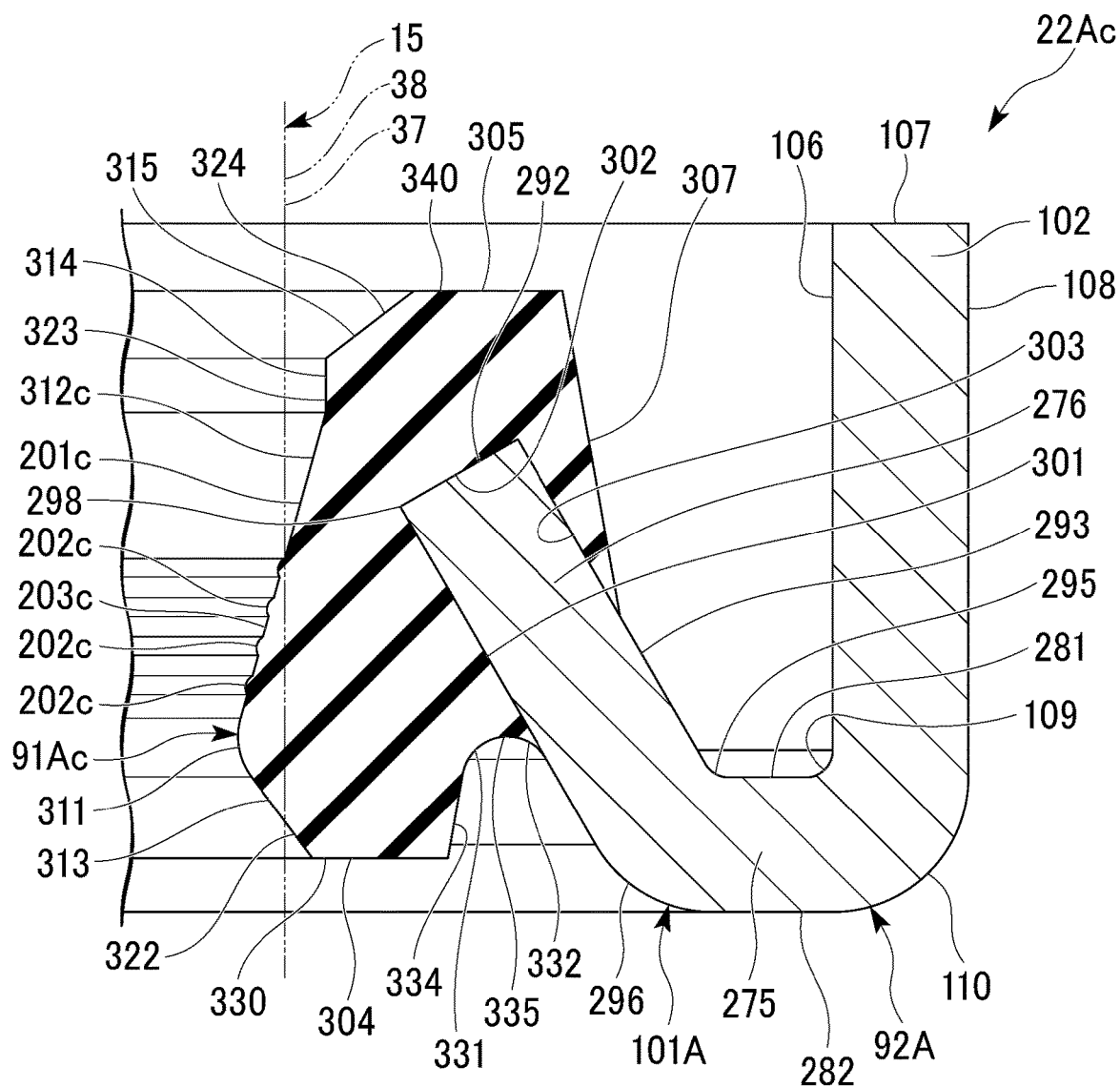
FIG. 10 is a half cross-sectional view showing a modified example 2-3 of the friction member of the shock absorber according to the second embodiment of the present invention.

As shown in FIG. 10, the friction member 22Ac of the modified example 2-3 includes an elastic rubber section 91Ac that is partially different from the elastic rubber section 91A. Note that, FIG. 10 also shows the friction member 22Ac in a natural state before the piston rod 15 is inserted, and the outer peripheral surface 37 of the main shaft section 38 of the piston rod 15 when the piston rod 15 is inserted is shown by a virtual line (dashed line).

In the elastic rubber section 91Ac, the first enlarged diameter section 312c is partially different from the first enlarged diameter section 312. The first enlarged diameter section 312c includes a tapered enlarged diameter main body section 201c similar to the enlarged diameter main body section 201 of the first embodiment, and a plurality of, specifically, four ribs 202c which protrude inward in the radial direction beyond the enlarged diameter main body section 201c, similar to the ribs 202 of the first embodiment. Therefore, in the first enlarged diameter section 312c, a plurality of, specifically, four recessed grooves 203c are formed similar to the recessed groove 203 of the first embodiment.

The plurality of ribs 202c and the plurality of recessed grooves 203c are formed in a range between the inner end section 298 of the base section 92A and the minimum inner diameter section 311 of the elastic rubber section 91Ac in the axial direction.

In other words, the plurality of ribs 202c and the plurality of recessed grooves 203c are disposed on the side of the piston 18 rather than the inner end section 298 of the base section 92A in the axial direction that is the same side where the minimum inner diameter section 311 is disposed.

In the friction member 22Ac having such a structure, in a case where the piston rod 15 moves to the contraction side (lower side in FIG. 10), the moment is not generated inward in the radial direction (left direction in FIG. 10) substantially around the inner end section 298 at a part between the adhesion part of the elastic rubber section 91Ac to the piston rod 15 and the inner end section 298 of the base section 92A, and thus the increase in the surface pressure, that is, the tension force to the piston rod 15 at the adhesion part of the elastic rubber section 91Ac to the piston rod 15 is suppressed. Here, since the oil liquid is held between the plurality of recessed grooves 203c, the friction coefficient μ is lowered, and an axial force is applied to the piston rod 15 so as to be more easily moved in the inward direction of the cylinder 19.

Here, instead of the plurality of ribs 202c of the friction member 22Ac, it is possible to form a large number of protrusions 232 described in the modified example 1-1, or it is possible to form the plurality of inclined ribs 242 described in the modified example 1-2.

Third Embodiment

Figure 11:
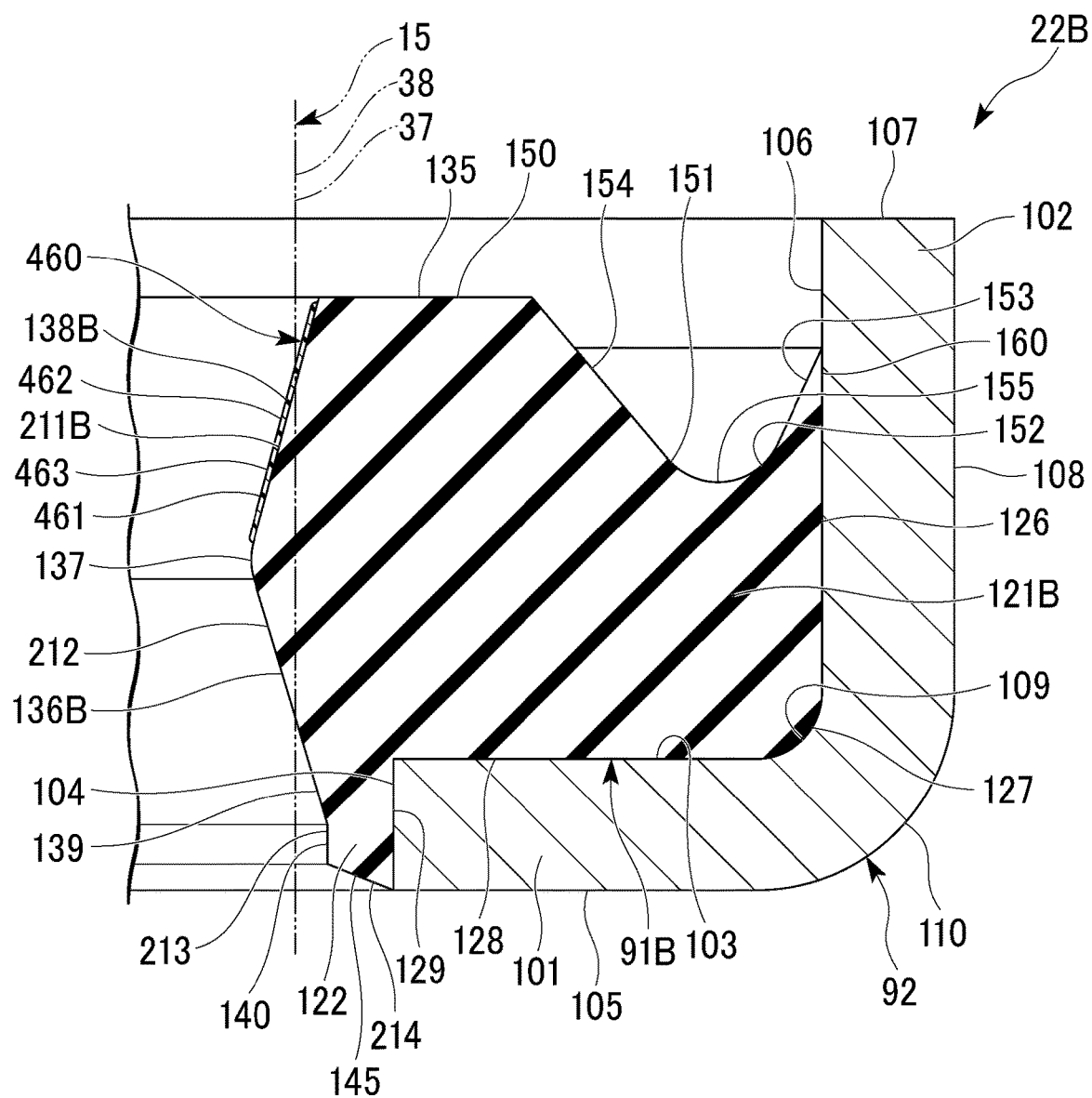
FIG. 11 is a half cross-sectional view showing a friction member of a shock absorber according to a third embodiment of the present invention.

Next, a third embodiment according to the present invention will be described mainly based on FIG. 11 while focusing on differences from the first embodiment. Note that, parts common to the first embodiment are represented by the same names and the same reference numerals.

In the third embodiment, a friction member 22B that is partially different from the friction member 22 of the first embodiment is used. Note that, FIG. 11 also shows the friction member 22B in a natural state before the piston rod 15 is inserted, and the outer peripheral surface 37 of the main shaft section 38 of the piston rod 15 when the piston rod 15 is inserted is shown by a virtual line (dashed line).

The friction member 22B includes an elastic rubber section 460 that is partially different from the elastic rubber section 91. The elastic rubber section 460 includes an elastic rubber section 91B that includes a main body section 121B having a tapered first enlarged diameter section 138B in which a plurality of ribs 202 are not formed with respect to the elastic rubber section 91, and a coating layer 461 that is provided on the inner peripheral surface 211B formed of a tapered surface of the first enlarged diameter section 138B of the first elastic rubber section 91B. The coating layer 461 has a smaller frictional force than the inner peripheral surface 212 of the second enlarged diameter section 139. The coating layer 461 is formed, for example, by applying a coating material to the inner peripheral surface 211B of the first enlarged diameter section 138B of the elastic rubber section 91B.

In the elastic rubber section 460, the coating layer 461 applied to the first enlarged diameter section 138B of the elastic rubber section 91B serves as a first enlarged diameter section 462. The elastic rubber section 460 abuts the outer peripheral surface 37 of the main shaft section 38 of the piston rod 15 on an inner peripheral surface 463 (first abutting surface) of the coating layer 461 which is a surface of the first enlarged diameter section 462. The coating layer 461 has a sealing property, and is formed of a material having the friction coefficient μ smaller than that of the elastic rubber section 91B including the second enlarged diameter section 139. The inner peripheral surface 136B of the elastic rubber section 460 includes the inner peripheral surface 463 of the coating layer 461 of the first enlarged diameter section 462 and an inner peripheral surface 212 of the second enlarged diameter section 139.

As above, in a case where the inner peripheral surface 463 of the first enlarged diameter section 462, which is slidably in contact when the piston rod 15 moves to the contraction side, is formed on the coating layer 461 having the smaller friction coefficient μ, that is the frictional force, than that of the inner peripheral surface 212 of the second enlarged diameter section 139 which slidably contacts when the piston rod 15 moves to the extension side, the friction member 22B applies the axial force to the piston rod 15 such that the movement of the piston rod 15 to the outside in the cylinder inner and outer direction of the cylinder 19 becomes difficult and the movement of the piston rod 15 to the inside in the cylinder inner and outer direction of the cylinder 19 becomes easy.

According to the third embodiment, the friction member 22B applies the axial force to the piston rod 15 such that the movement of the piston rod 15 in the outward direction of the cylinder 19 becomes difficult and the movement of the piston rod 15 in the inward direction of the cylinder 19 becomes easy. Therefore, as in the first embodiment, the movement in which the sprung part connected to the unsprung part through the shock absorber 11 sinks with respect to the unsprung part hardly occurs, and thus the stroke feeling and the yaw responsiveness of the shock absorber 11 are improved. Therefore, it is possible to obtain preferable damping force characteristics.

In addition, in the friction member 22B, the inner peripheral surface 463 of the first enlarged diameter section 462 is formed of the coating layer 461 having a smaller frictional force than the inner peripheral surface 212 of the second enlarged diameter section 139, and thus it is possible to apply the axial force as described above to the piston rod 15 with a simple structure. Note that, the coating layer 461 may be formed by adhering another material in addition to applying the coating material.

In the above embodiment, the double cylinder type oil-pressure shock absorber is exemplified as the liquid-pressure shock absorber, but a liquid-pressure shock absorber, such as a single cylinder oil-pressure shock absorber or an oil-pressure active suspension, may be applied.

According to a first aspect of the embodiment described above, a shock absorber includes a cylinder that is filled with a working liquid; a piston that is slidably fitted in the cylinder and divides an inside of the cylinder into two chambers; a piston rod that is connected to the piston and extends to an outside of the cylinder; a seal member that slidably contacts with the piston rod to prevent the working liquid from leaking from the cylinder to the outside; a friction member that is provided further inside of the cylinder than the seal member, and is formed of an annular elastic rubber section which slidably contacts with the piston rod and an annular base section to which the elastic rubber section is fixed; and a communication path that reduces pressure difference between both sides of the friction member in an axial direction. The elastic rubber section is provided with, on an inner peripheral side, a minimum inner diameter section, a first enlarged diameter section whose diameter is enlarged toward a side opposite to a cylinder inner chamber from the minimum inner diameter section, and a second enlarged diameter section whose diameter is enlarged toward the cylinder inner chamber from the minimum inner diameter section. The friction member applies a force to the piston rod such that movement of the piston rod in an outward direction of the cylinder becomes difficult and the movement of the piston rod in an inward direction of cylinder becomes easy. Therefore, it is possible to obtain preferable damping force characteristics.

According to a second aspect, in the first aspect, the base section includes a perforated disk-shaped bottom section, and a tube section extending in the axial direction from an outer peripheral side of the bottom section. The minimum inner diameter section and the second enlarged diameter section of the elastic rubber section are disposed on a side of the cylinder inner chamber with respect to an inner end of the bottom section of the base section.

Thereby, it is possible to obtain preferable damping force characteristics with a simple configuration.

According to a third aspect, in the first or second aspect, a first abutting surface, which abuts the piston rod, of the first enlarged diameter section of the elastic rubber section has a small frictional force, as compared with a second abutting surface, which abuts the piston rod, of the second enlarged diameter section. Thereby, it is possible to obtain preferable damping force characteristics with a simple configuration.

In the fourth aspect, in the third aspect, a plurality of concavity and convexity are formed on the first abutting surface. Thereby, it is possible to realize reduction in the frictional force of the first abutting surface as compared with the second abutting surface with a simple configuration.

According to a fifth aspect, in the third aspect, the first abutting surface is formed of a coating layer having a smaller frictional force than the second abutting surface. Thereby, it is possible to obtain preferable damping force characteristics with a simple configuration.

According to the sixth aspect, in any one of the second to fifth aspects, the base section has the tube section that protrudes from a perforated disk-shaped bottom section toward the cylinder inner chamber.

INDUSTRIAL APPLICABILITY

According to the above-described shock absorber, it is possible to obtain preferable damping force characteristics.

REFERENCE SIGNS LIST

11 Shock absorber
15 Piston rod
16, 17 Chamber
18 Piston
19 Cylinder
21 Seal member
22, 22a, 22b, 22A, 22Aa, 22Ab, 22Ac, 22B Friction member
91, 91a, 91b, 91A, 91Aa, 91Ab, 91Ac, 460 Elastic rubber section
92, 92A, 92Aa Base section
101, 101A, 101Aa Bottom section
102, 102Aa Tube section
104, 413 Inner end surface (inner end)
137, 311 Minimum inner diameter section
138, 138a, 138b, 312, 312c, 462 First enlarged diameter section
139, 313 Second enlarged diameter section
161 Communication path
211, 211a, 211b, 463 Inner peripheral surface (first abutting surface)
212 Inner peripheral surface (second abutting surface)
298 Inner end section (inner end)
461 Coating layer

The invention claimed is:

1. A shock absorber comprising:
a cylinder that is filled with a working liquid;
a piston that is slidably fitted in the cylinder and divides an inside of the cylinder into two chambers;
a piston rod that is connected to the piston and extends to an outside of the cylinder;
a seal member that slidably contacts with the piston rod to prevent the working liquid from leaking from the cylinder to the outside;
a friction member that is provided further inside of the cylinder than the seal member, and is formed of an annular elastic rubber section which slidably contacts with the piston rod and an annular base section configured of a perforated disk-shaped bottom section, to which the elastic rubber section is fixed, a tube section, which extends in the axial direction from an outer peripheral side of the bottom, section and to which the elastic rubber section is fixed, and a tapered tube section extending in an axial direction while reducing a diameter from an inner peripheral side of the bottom section; and a communication path that reduces pressure difference between both sides of the friction member in an axial direction, wherein the elastic rubber section is provided with, on an inner peripheral side, a minimum inner diameter section, a first enlarged diameter section whose diameter is enlarged toward a side opposite to a cylinder inner chamber from the minimum inner diameter section, and a second enlarged diameter section whose diameter is enlarged toward the cylinder inner chamber from the minimum inner diameter section, wherein the friction member applies a force to the piston rod such that movement of the piston rod in an outward direction of cylinder becomes difficult and the movement of the piston rod in an inward direction of the cylinder becomes easy, and wherein the minimum inner diameter section and the second enlarged diameter section of the elastic rubber section are disposed on a side of the cylinder inner chamber with respect to an inner end of the bottom section of the base section.

2. The shock absorber according to claim 1, wherein a first abutting surface, which abuts the piston rod, of the first enlarged diameter section of the elastic rubber section has a small frictional force, as compared with a second abutting surface, which abuts the piston rod, of the second enlarged diameter section.

3. The shock absorber according to claim 2, wherein a plurality of recessed grooves and ribs are formed on the first abutting surface.

4. A shock absorber comprising:

a cylinder that is filled with a working liquid;

a piston that is slidably fitted in the cylinder and divides an inside of the cylinder into two chambers;

a piston rod that is connected to the piston and extends to an outside of the cylinder;

a seal member that slidably contacts with the piston rod to prevent the working liquid from leaking from the cylinder to the outside;

a friction member that is provided further inside of the cylinder than the seal member, and is formed of an annular elastic rubber section which slidably contacts with the piston rod and an annular base section configured of a perforated disk-shaped bottom section, to which the elastic rubber section is fixed, and a tube section, which extends in the axial direction from an outer peripheral side of the bottom section and to which the elastic rubber section is fixed; and a communication path that reduces pressure difference between both sides of the friction member in an axial direction, wherein the elastic rubber section is provided with, on an inner peripheral side, a minimum inner diameter section, a first enlarged diameter section whose diameter is enlarged toward a side opposite to a cylinder inner chamber from the minimum inner diameter section, and a second enlarged diameter section whose diameter is enlarged toward the cylinder inner chamber from the minimum inner diameter section, wherein the friction member applies a force to the piston rod such that movement of the piston rod in an outward direction of cylinder becomes difficult and the movement of the piston rod in an inward direction of the cylinder becomes easy, wherein a first abutting surface, which abuts the piston rod, of the first enlarged diameter section of the elastic rubber section has a small frictional force, as compared with a second abutting surface, which abuts the piston rod, of the second enlarged diameter section, and wherein the first abutting surface is formed of a coating layer having a smaller frictional force than the second abutting surface.

* * * * *